US012585602B2

(12) United States Patent
Nurvitadhi et al.

(10) Patent No.: US 12,585,602 B2
(45) Date of Patent: Mar. 24, 2026

(54) SYSTEMS AND METHODS FOR PROCESSOR CIRCUITS

(71) Applicant: Intel Corporation, Santa Clara, CA (US)

(72) Inventors: Eriko Nurvitadhi, Beaverton, OR (US); Martin Langhammer, Salisbury (GB); Andrew Boutros, Toronto (CA)

(73) Assignee: Altera Corporation, San Jose, CA (US)

( * ) Notice: Subject to any disclaimer, the term of this patent is extended or adjusted under 35 U.S.C. 154(b) by 936 days.

(21) Appl. No.: 17/561,534

(22) Filed: Dec. 23, 2021

(65) Prior Publication Data

US 2022/0121593 A1 Apr. 21, 2022

(51) Int. Cl.
*G06F 13/40* (2006.01)
*G06F 8/41* (2018.01)
(Continued)

(52) U.S. Cl.
CPC .......... *G06F 13/4022* (2013.01); *G06F 8/433* (2013.01); *G06F 8/457* (2013.01);
(Continued)

(58) Field of Classification Search
CPC ...... G06F 13/4022; G06F 8/433; G06F 8/457; G06F 9/30036; G06F 9/30141;
(Continued)

(56) References Cited

U.S. PATENT DOCUMENTS 9,652,027 B2 * 5/2017 Sharda ................... G06F 1/329
2003/0036809 A1 * 2/2003 Landman .............. G06F 9/5027
700/86

(Continued)

FOREIGN PATENT DOCUMENTS

WO 2021168861 9/2021

OTHER PUBLICATIONS

Korean Intellectual Property Office, "Written Opinion of the International Searching Authority," International application No. PCT/US2022/050643, Jun. 14, 2023, pp. 1-7.
(Continued)

*Primary Examiner* — Farley Abad
(74) *Attorney, Agent, or Firm* — InventIQ Legal LLP; Steven J. Cahill

(57) ABSTRACT

A processor circuit includes a first front-end circuit for scheduling first instructions for a first program and a second front-end circuit for scheduling second instructions for a second program. A back-end processing circuit processes first operations in the first instructions and second operations in the second instructions. A multi-program scheduler circuit causes the first front-end circuit to schedule processing of the first operations on the back-end processing circuit and causes the second front-end circuit to schedule processing of the second operations on the back-end processing circuit. A processor generator system includes a processor designer that creates specifications for a processor using workloads for a program, a processor generator that generates a first processor instance using the specifications, a processor optimizer that generates a second processor instance using the workloads, and a co-designer that modifies the program using the second processor instance.

22 Claims, 16 Drawing Sheets

(51) Int. Cl.
    *G06F 9/30*        (2018.01)
    *G06F 9/38*        (2018.01)
    *G06F 13/376*     (2006.01)

(52) U.S. Cl.
    CPC ...... *G06F 9/30036* (2013.01); *G06F 9/30141*
    (2013.01); *G06F 9/3851* (2013.01); *G06F*
    *9/3888* (2023.08); *G06F 13/376* (2013.01)

(58) Field of Classification Search
    CPC .... G06F 9/3851; G06F 9/3888; G06F 13/376;
    G06F 9/3838; G06F 9/4881; G06F
    15/7867; Y02D 10/00
    See application file for complete search history.

(56) References Cited

U.S. PATENT DOCUMENTS

| | | | | |
|---|---|---|---|---|
| 2007/0283356 | A1* | 12/2007 | Du | G06F 9/3851 |
| | | | | 712/E9.046 |
| 2008/0074433 | A1* | 3/2008 | Jiao | G06T 15/005 |
| | | | | 345/522 |
| 2014/0285500 | A1* | 9/2014 | Lindholm | G06T 1/20 |
| | | | | 345/506 |
| 2016/0283438 | A1* | 9/2016 | Chen | G06F 15/80 |
| 2018/0011738 | A1 | 1/2018 | Abdallah | |
| 2018/0121388 | A1 | 5/2018 | Rennich | |
| 2018/0285116 | A1* | 10/2018 | Vembu | G06F 15/16 |
| 2018/0341486 | A1* | 11/2018 | Fowers | G06F 9/3867 |
| 2018/0365009 | A1* | 12/2018 | Nield | G06F 9/3867 |
| 2020/0012518 | A1* | 1/2020 | Witek | G06F 9/4881 |
| 2021/0216318 | A1 | 7/2021 | Langhammer et al. | |
| 2022/0058024 | A1* | 2/2022 | Fang | G06F 9/3017 |
| 2022/0092439 | A1* | 3/2022 | Liu | G06N 5/02 |

OTHER PUBLICATIONS

Andrew Boutros et al., "Beyond Peak Performance: Comparing the Real Performance of AI-Optimized FPGAs and GPUs," White Paper, 2020 IEEE International Conference on Field Programmable Technology (FPT), pp. 1-10.
"Ultra Low Latency and High Performance Deep Learning Processor with FPGA," Alibaba Clouder, Aug. 27, 2018, pp. 1-9, https://www.alibabacloud.com/blog/ultra-low-latency-and-high-performance-deep-learning-processor-with-fpga_593942.
Eriko Nurvitadhi et a., "Real Performance of FPGAs Tops GPUs in the Race to Accelerate AI," White Paper, pp. 1-5, Mar. 29, 2021.
Eric Chung et al., "Serving DNNs in Real Time at Datacenter Scale with Project Brainwave," pp. 1-11, https://www.microsoft.com/en-us/research/uploads/prod/2018/03/mi0218_Chung-2018Mar25.pdf, Apr. 20, 2018.

* cited by examiner

Broadcast PE

Systolic PE

SYSTEMS AND METHODS FOR PROCESSOR CIRCUITS

FIELD OF THE DISCLOSURE

This disclosure generally relates to electronic circuit systems and methods, and more particularly, to systems and methods for processor circuits.

BACKGROUND

Integrated circuit devices may be utilized for a variety of purposes or applications, such as digital signal processing and machine-learning. Indeed, machine-learning and artificial intelligence applications have become ever more prevalent. Integrated circuit devices, such as programmable logic devices, may be utilized to perform these functions, for example, using particular circuitry (e.g., processing blocks). For example, integrated circuit devices may utilize particular circuitry for artificial intelligence (AI) and/or machine-learning (MIL) purposes.

DETAILED DESCRIPTION

Figure 1A:
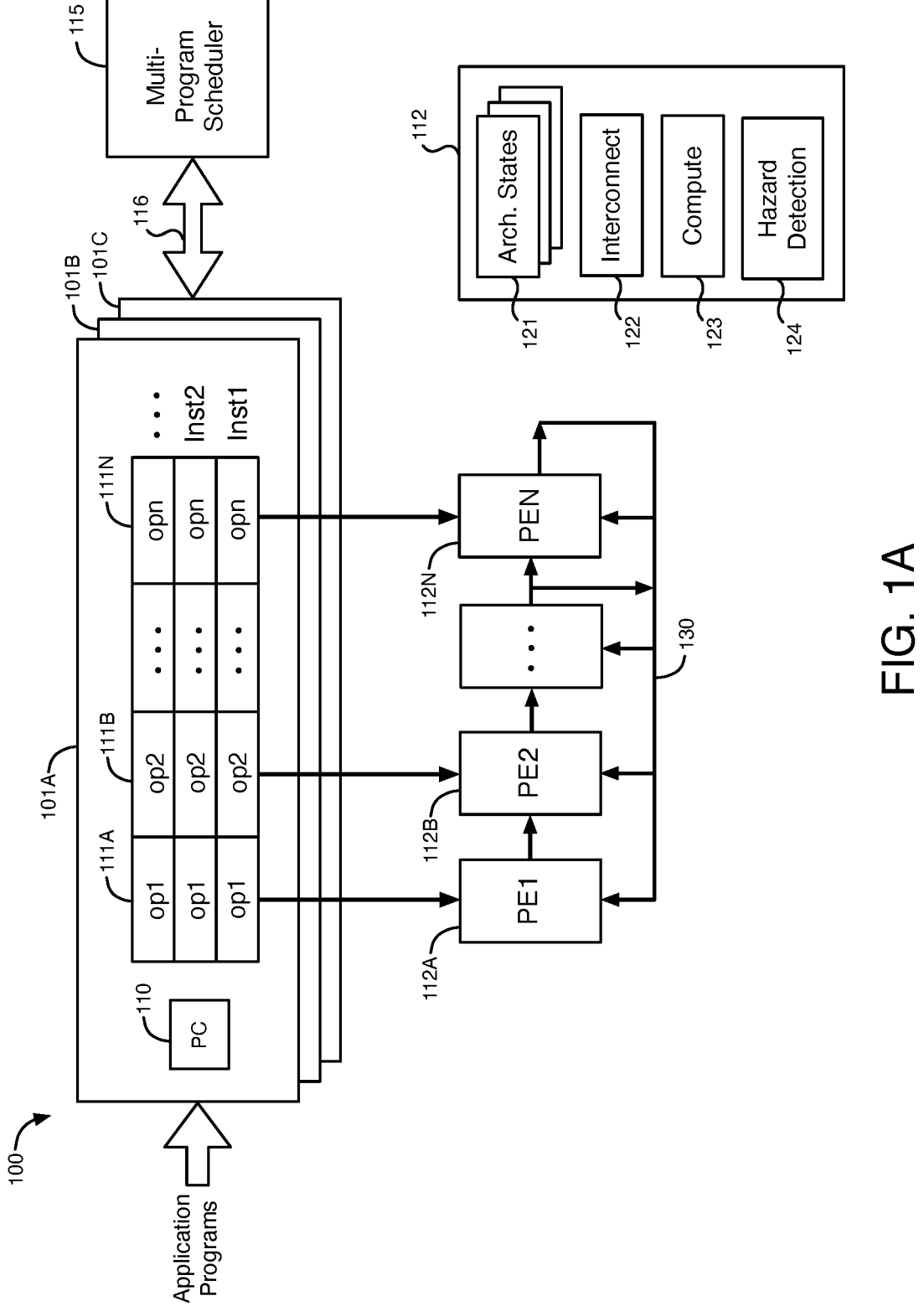
FIG. 1A is a diagram that illustrates an example of a processor circuit that can process multiple software application programs concurrently (i.e., multi-programming).

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

More specifically, this disclosure discusses processing systems that can be implemented on integrated circuit devices, including programmable logic devices such as field-programmable gate arrays (FPGAs). As discussed herein, the processing systems may harness hard logic and soft logic of an FPGA to perform processing. As used herein, "hard logic" generally refers to circuits in an integrated circuit device (e.g., a programmable logic device) that are not programmable by an end user. The circuits in the integrated circuit device that are programmable by the end user are considered "soft logic." For example, hard logic circuits in an FPGA may include arithmetic units (e.g., digital signal processing (DSP) blocks) that are included in an FPGA and unchangeable by the end user. Processing units that perform operations (e.g., math operations) may be implemented as hard logic on an FPGA that is able to perform the specific operations at a relatively higher efficiency (e.g., compared to performing the operations using soft logic). Values to be processed, such as vectors or scalars, may be read from and stored in memory that is included in the FPGA. That is, an integrated circuit device may include memory that is a "hard" feature, meaning the memory is included on the integrated circuit device (e.g., when provided to an end user). Routing between the processing units and memory may be implemented using a combination of hard logic and soft logic. According to some implementations, the techniques described below may harness the flexibility of soft logic and hard features (e.g., hard logic and memory blocks) of FPGAs to provide customizable and efficient processing architectures.

Multiple application domains (e.g., AI, ML, databases, etc.) are growing in importance, and becoming prevalent computing workloads that demand highly efficient compute solutions. Such domains often contain sequences of complex coarse-grained (CG) operations. Coarse-grained operations are operations performed on sets of data that are larger than fine-grained scalar data. As examples, coarse-grained operations include operations performed by AI on tensors (e.g., matrices) and operations performed by databases on tables. Essentially, coarse-grained data structures (e.g., tables and matrices) are a composition of fine-grained scalar data.

Conventional processors operate mainly on scalar data for generality, while operating on coarse-grained data structures (e.g., vectors, matrices, tensors, tables) as the native data type achieves higher efficiency and easier programmability for application domains that rely mainly on these data structures, but are less efficient for general-purpose computing. To compete in such application domains, conventional scalar processors can add Single-Instruction Multiple Data (SIMD) or Single Instruction Multiple Threads (SIMT) features to "coarsen" their granularity by operating on multiple scalar values and at the same time using multiple scalar arithmetic logic units (ALUs).

Among existing computer architectural types, Complex Instruction Set Computer (or Computing) (CISC) is suitable for processing complex sequences of operations. Each of the complex instructions used by a CISC processor can perform multiple low-level operations, such as multiple arithmetic operations, memory read, and/or memory write operations. Architectures for CISC processors achieve higher efficiency for performing chained sequences of operations, where a single instruction can be used to sequentially perform different operations on the data as the data moves from one processing element to the next (without writing intermediate results to an architectural state and reading the state back). Coarse-grained Complex Instruction Set Computing (CG-CISC) architectures incorporate complex compute units that natively operate on coarse-grained (CG) data for increased efficiency. Architectures for CISC processors amortize the control overhead and raise the programming abstraction, such that each operation in a CG-CISC instruction can trigger thousands of low-level micro-operations (e.g., a matrix-matrix multiplication operation in a CG-CISC instruction can trigger thousands of multiply-add or dot product micro-operations). Micro-operations are similar to fine-grained operations (e.g., on scalar data).

Traditionally, CISC processors have operated on more fine-grained operations (e.g., scalar, vectors). In a fine-grained CISC processor, a coarse-grained data structure has to be processed in multiple steps (i.e., broken down as multiple scalar pieces and processed scalar-by-scalar). The concept of CISC processing can also be applied to processing coarse-grained data (e.g., matrices and tables that are each composed of multiple scalar or vector values). A coarse-grained CISC processor can process coarse-grained data in fewer steps (e.g., matrix data can be read in one step, and processed in one instruction by a matrix compute functional unit in a processing element). Coarse-grained CISC processors can provide improved efficiency, lower control and instruction overhead relative to compute resources, and coarse-grained operations that are optimized for a target domain.

Specializing a CISC architecture for a target domain can improve execution efficiency significantly, if the instruction set and the corresponding processor micro-architecture are tailored for the coarse-grained operations commonly used in the domain. Existing domain-specific coarse-grained CISC (CG-CISC) processors have shortcomings. For example, the existing domain-specific CG-CISC processors were created manually, only support single-program execution, and do not support multi-threading and multi-programming. Multi-threading and multi-programming can provide many benefits for CG-CISC processor architectures. For example, because processing elements of the architecture operate on CG data structures, and a single instruction can trigger thousands of micro-operations to be executed on a processing element to produce a result that is consumed by the next processing element, the remaining processing elements can remain idle for a period of time waiting for their inputs to be produced by the previous processing element. Multi-threading or multi-programming can effectively use the idle time of these processing elements to execute the same operations on a different set of data that is ready to process (multi-threading) or a different set of instructions (multi-programming) to increase the overall efficiency of the processor architecture.

In practice, use cases with multiple applications within an application domain that demand multi-threading and multi-programming support have been growing (e.g., ensembles of neural networks in AI). Furthermore, creating domain-specific CG-CISC processors manually for a given target application requires tremendous effort, cost, and time by a team of inter-disciplinary experts. These challenges apply for CG-CISC processors that are realized on FPGAs as well as in application specific integrated circuits (ASICs). A CG-CISC processor may be implemented in an FPGA using soft logic, hard logic, or a combination of both soft logic and hard logic to achieve higher efficiency. The unique reconfigurability of an FPGA allows re-configuring a single FPGA device over time to deploy multiple instances of CG-CISC processors implemented at least in part in soft logic and specialized for different application domains or to update a CG-CISC processor with a new specialized instance as an application domain evolves.

According to some examples disclosed herein, CG-CISC processors provide efficient multi-threading and/or multi-programming for target application domains that need efficient compute solutions. The CG-CISC processors can run multiple programs and/or multiple threads that share the same pipeline. The CG-CISC processors may have architectural states that are shared among custom programs and/or threads. In specific implementations, a CG-CISC processor that provides multi-threading and/or multi-programming may be built as a processor on a programmable logic integrated circuit (e.g., combination of soft and hard features in an FPGA) or manufactured as a hard processor in silicon.

FIG. 1A is a diagram that illustrates an example of a processor circuit 100 that can process multiple software application programs concurrently (i.e., multi-programming). Processor circuit 100 may be, for example, a coarse-grained Complex Instruction Set Computer (CG-CISC) processor circuit or another type of processor circuit. Processor circuit 100 may be in any type of integrated circuit (IC), such as a programmable integrated circuit (IC), a microprocessor, a graphics processing unit (GPU), an application specific IC, etc. Programmable ICs include any integrated circuits that may be programmed to perform desired functions, including programmable logic arrays (PLAs), programmable array logic (PAL), field programmable gate arrays (FPGAs), and programmable logic devices (PLDs).

Processor circuit 100 includes a front-end 101 and a back-end circuit (i.e., a back-end processing circuit). Processor circuit 100 includes multiple front-end circuits 101. FIG. 1A shows three front-end circuits 101A, 101B, and 101C as examples. Although, it should be understood that processor circuit 100 may include any number of front-end circuits 101. Each of the front-end circuits 101 may, for example, be implemented using a different block of circuits in processor circuit 100. The back-end circuit of processor circuit 100 includes an N number of processing elements 112 that perform back-end processing operations, such as arithmetic computations, data management, etc. Processing elements (PEs) 112 may also be referred to herein as processing circuits or processing subsystems. N may be any positive integer number greater than 0. FIG. 1A shows three processing elements 112A, 112B, . . . 112N in processor circuit 100 as examples. Although, it should be understood that processor circuit 100 may include any number of processing elements 112. Each of the processing elements 112 may, for example, be implemented using a different block of circuits in processor circuit 100. The processing elements 112 are implemented using different blocks of circuits in processor circuit 100 than the front-end circuits 101.

Each of the front-end circuits 101 performs front-end processing for a separate software application program. For example, front-end circuit 101A can process a first application program, front-end circuit 101B can process a second application program, and front-end circuit 101C can process a third application program. Each of the front-end circuits 101 may perform front-end processing for the corresponding application program, such as fetching instructions for the program that are stored in memory, performing decoding operations, scheduling the execution of the instructions and operations within the instructions, sending control signals, operations, and data for the program to the processing elements 112, etc.

The software application programs executed by processor circuit 100 may be, for example, machine learning (ML) or artificial intelligence (AI) programs, database programs, etc. Each of the application programs may be for a separate application. Each of the application programs that are executed by processor circuit 100 includes multiple instructions (such as instructions Inst1, Inst2, etc.). Each of these instructions includes multiple operations 111, such as operations op1 111A, operations op2 111B, and operations opn 111N. Each row of operations (op1, op2, . . . opn) in FIG. 1A is associated with an instruction in a program. The operations 111 in the application programs may be, for example, coarse-grained operations, such as arithmetic operations performed on vectors, matrices, or tables.

Each of the front-end circuits 101 includes a program counter (PC) 110 that controls the sequencing and scheduling of the instructions (instructions Inst1, Inst2, etc.) in one of the application programs and the operations in each of the instructions for that program. Each of the front-end circuits 101 provides the operations within each instruction in one of the application programs to the processing elements 112. The processing elements 112 execute the operations received from the front-end circuits 101. Each of the processing elements 112 processes one of the operations in one of the instructions in a given time interval. In the example of FIG. 1A, processing elements 112A, 112B, and 112N process operations op1, op2, and opn, respectively, for each instruction.

In the lower right of FIG. 1A, some internal features of the processing elements 112 are shown as examples. Processor circuit 100 includes support for the architectural states 121 (e.g., register files) of multiple program contexts (e.g., for multiple programs on front-end circuits 101), as disclosed in further detail herein with respect to FIG. 4. In addition, processor circuit 100 includes interconnect resources 122 (e.g., buses, clock trees, multiplexer circuits, etc.) and compute resources 123 (e.g., matrix and/or vector compute blocks) that may be shared between the programs processed on the front-end circuits 101 and on the processing elements 112. In traditional CISC processors operating on scalar values, compute blocks may be a multiplier accepting two scalars and producing one scalar. On the other hand, a coarse grained matrix multiplier unit in compute resources 123 can accept multiple rows of matrices and produce an entire vector output.

Processing circuit 100 also includes a multi-program scheduler circuit 115. Multi-program scheduler circuit 115 may include firmware that determines which of the operations from the instructions in the various application programs on the front-end circuits 101 are to be processed by the processing elements 112 at any given time. Multi-program scheduler circuit 115 provides control signals 116 to the front-end circuits 101 that cause the front-end circuits 101 to provide the operations selected by circuit 115 to the processing elements 112. Multi-program scheduler circuit 115 may cause different processing elements 112 to execute operations from different instructions and/or from different programs concurrently, as described below. Multi-program scheduler circuit 115 may have a customizable number of program contexts and/or scheduling schemes (e.g., round-robin, highest-priority-first, etc.) for scheduling the execution of the operations, the instructions, and the programs.

Processing elements 112 are chained together (i.e., each PE forwards its outputs to the next PE), as shown by arrows in FIG. 1A. One or multiple PEs 112 can have the ability to write back the results of the processing pipeline to any of the architectural states in all or in a subset of the PEs 112 in the chain, as shown for example, by write back paths 130 in FIG. 1A. If the result does not need to be written back to any of the architectural states, the chain of PEs 112 can also forward its result directly to the output of the processor. Each of the processing elements 112 may provide the output of one of the operations in an instruction to the next processing element as an input for performing another operation in the same program. For example, processing element PE1 112A provides the output of operation op1 to processing element 112B PE2. Processing element PE2 112B provides the output of operation op2 to the third processing element (not shown). Processing element PEN 112N receives an input from a previous processing element and provides the output of operation opn to any one or more of the processing elements 112A PE1, 112B PE2, etc. in the chain (e.g., for a subsequent instruction). Each of the processing elements 112 may, for example, perform one of the operations in an instruction using the output of one or more of the processing elements that performed an operation in the same instruction or in another instruction in the same program. For example, processing element PE1 112A may perform operation op1 using the output of operation opn from processing element 112N as an input (e.g., generated in a previous instruction). Processing element 112B PE2 may perform operation op2 using the output of operation op1 from processing element 112A as an input. Processing element 112N may perform operation opn using the output of a previous operation (not shown) as an input. As other examples, processing elements 112 may contain (1) no loop back connections to other PEs 112, (2) a loop where any PE 112 (i.e., not just PEN 112N) can perform a write back to one or more other PEs 112, or (3) a loop where the recipient of a write back from a PE 112 can be any earlier PE 112 in the PE chain.

Each of the processing elements 112 performs one of the operations to generate an output that may be provided to a subsequent (or previous) processing element 112 in the chain having a data dependency on the output of that processing element. Each operation having a data dependency on one or more other operations is delayed until those operations are completed. A data dependency may refer to an operation having to use a data output by another operation as an input. For example, if operation op2 in instruction Inst1 of the program on front-end circuit 101A requires the output of operation op1 in instruction Inst1 of the program on front-end circuit 101A to perform operation op2, then the processing of operation op2 is stalled or delayed, until the processing of operation op1 in instruction Inst1 on processing element 112A is completed. While the processing of operation op2 in instruction Inst1 on front-end circuit 101A is delayed, multi-program scheduler circuit 115 may cause processing element 112B to process an operation from another program on another one of the front-end circuits 101 (e.g., front-end circuits 101B or 101C) that does not have a data dependency on the output of operation op1 in instruction Inst1 in the program on front-end circuit 101A.

The multi-program scheduler circuit 115 may cause the processing elements 112 to process operations from multiple different application programs received from different ones of the front-end circuits 101 concurrently to improve the efficiency of processor circuit 100, as long as the operations processed concurrently do not have data dependencies on each other. Thus, multi-program scheduler circuit 115 may select operations from different programs on different front-end circuits 101 to execute concurrently on the processing elements 112. As a specific example, processing element 112A may process an operation op1 from an instruction in a first program on front-end 101A, processing element 112B may process an operation op2 from an instruction in a second program on front-end 101B concurrently with operation op1, and processing element 112N may process an operation opn from an instruction in a third program on front-end 101C concurrently with operations op1 and op2 being processed on PEs 112A-112B.

Figure 1B:
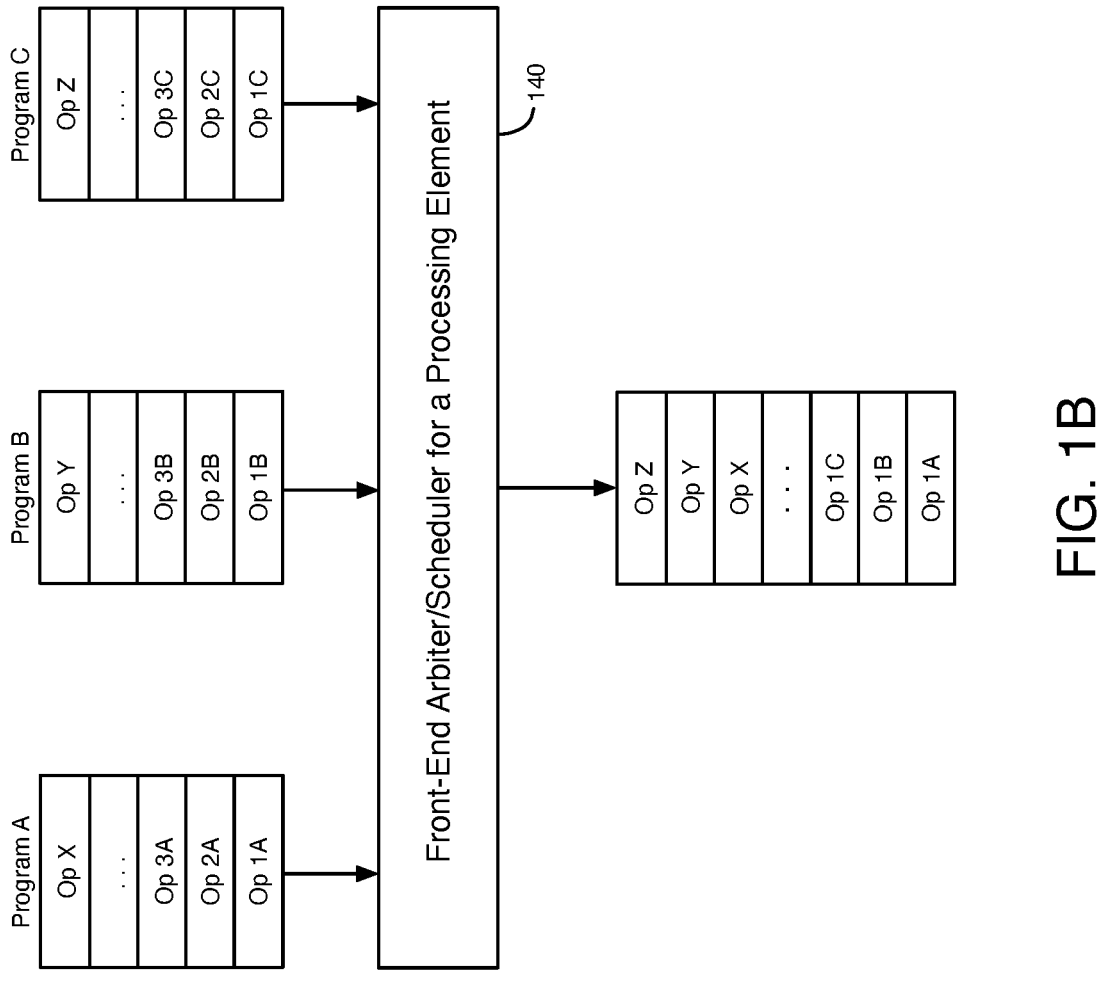
FIG. 1B is a diagram that illustrates an example of the multi-program scheduler circuit of FIG. 1A.

FIG. 1B is a diagram that illustrates an example of the multi-program scheduler circuit 115 of FIG. 1A executing operations in a round robin format. FIG. 1B illustrates how multiple instruction streams (i.e., programs) can be dynamically scheduled for execution based on a given arbitration criteria. An example of an arbitration criteria is round robin, in which operations are processed in cyclic order, executing one operation from each program. FIG. 1B shows an example of a front-end arbiter/scheduler 140 for any one of the processing elements 112. FIG. 1B shows operations from three different programs A-C that are scheduled by the front-end arbiter/scheduler 140 in a round robin format. One of the processing elements 112 processes the operations in the order received from scheduler 140, i.e., operation (Op) 1A from program A, then operation 1B from program B, then operation 1C from program C, then operation 2A from program A, then operation 2B from program B, then operation 2C from program C, etc. Another example of an arbitration criteria is Highest Priority First. In Highest Priority First, different programs have different priority levels based on the latency and performance requirements of the programs. If a high-priority program has an instruction ready to dispatch, the high-priority program breaks the cyclic order and is executed first. Yet another example of an arbitration criteria is No Hazard First. In No Hazard First, an instruction is executed first regardless of the order of the instructions, if the next instruction in a program has no dependencies on other instructions in the program.

The multi-program scheduler circuit 115 may also cause the processing elements 112 to process operations from one or more of the instructions that are from the same application program concurrently to improve the efficiency of processor circuit 100, as long as the operations processed do not have data dependencies on each other. For example, processing elements 112 may process operations that are from the same instruction or that are from 2 or more different instructions in the same program concurrently, as long as the operations processing concurrently do not have data dependencies. As a specific example, processing element 112A may process a first operation op1 from a first instruction Inst1 in a program on front-end circuit 101A, processing element 112B may process a second operation op2 from a second instruction Inst2 in the program on front-end circuit 101A concurrently with operation op1 from instruction Instr1, and processing element 112N may process a third operation opn from a third instruction Instn in the program on front-end circuit 101A concurrently with operation op1 from instruction Instr1 being processed on PE 112A and operation op2 from instruction Instr2 being processed on PE 112B.

Each of the processing elements 112 may include a hazard detection circuit 124 that detects and resolves data dependencies between a current operation on the processing element 112 and other operations in the current instruction or in other instructions in an application program. The hazard detection circuits 124 perform hazard detection that involves identifying the operations that have a data dependency (i.e., a hazard). Hazard detection circuits 124 also perform hazard resolution that involves resolving the detected hazards (i.e., the detected data dependencies). As an example, hazard detection circuits 124 may resolve hazards by stalling a first operation that is dependent on a result from a second operation, waiting until the second operation is completed, and then performing a write-back of the result to the first operation. Another example of how to resolve a hazard involves forwarding the result of an operation from the PE that produces the result directly to the PE processing an operation with a data dependency on the result. As another example, hazard detection circuits 124 may resolve a hazard by generating a speculative result of an operation ahead of time, then later checking against the actual result of the operation, and if the speculated result is incorrect, the wrongly speculated operation is canceled (not written back) and re-executed.

The hazard detection circuits 124 in the processing elements 112 may generate control signals that indicate any potential data dependencies between the operations processed by processing elements 112 and any other operations. The hazard detection circuits 124 exchange these control signals with each other between the processing elements 112 to detect and resolve data dependencies between the operations being processed by processing elements 112. The hazard detection circuits 124 control the sequence of the execution of the operations being processed by processing elements 112 to resolve any data dependencies. The hazard detection circuits 124 can, for example, stall one or more of the operations that have a data dependency on another operation being processed or that has not yet been processed (e.g., that requires data generated by another operation), until that other operation has completed.

Figure 1C:
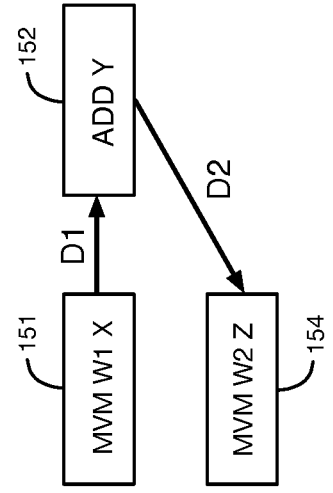
FIG. 1C is a diagram that illustrates an example of an implementation of hazard detection and resolution for a processor circuit.
Figure 1C:
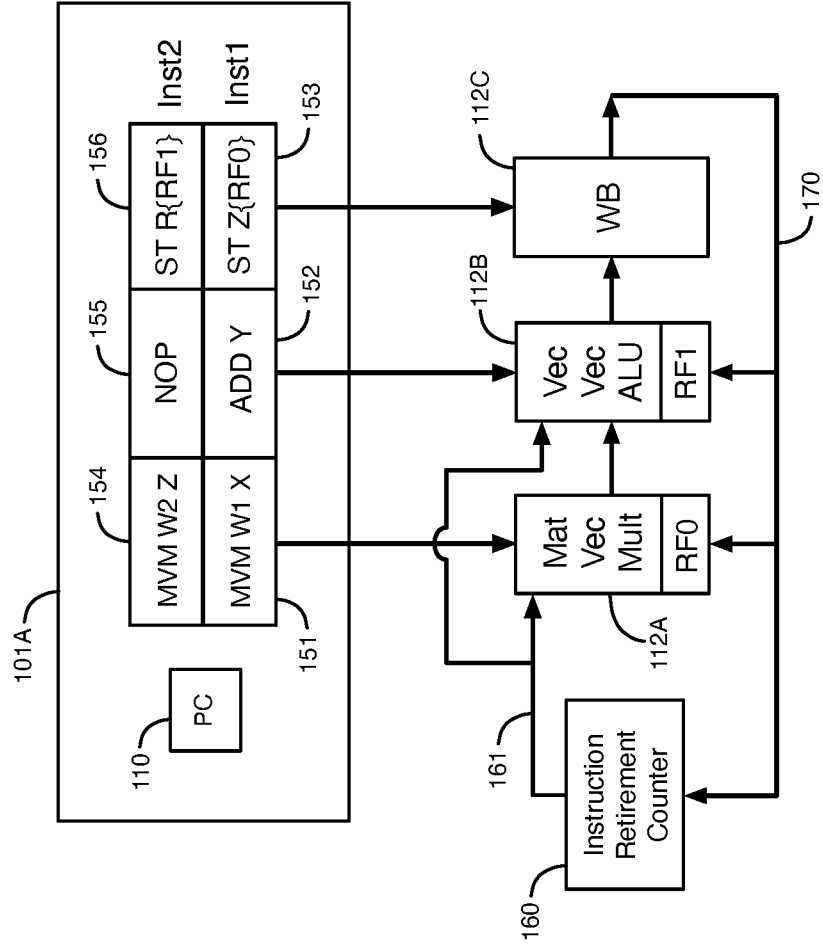

FIG. 1C is a diagram that illustrates an example of an implementation of hazard detection and resolution for a processor circuit. The processor circuit of FIG. 1C may be, for example, a CG-CISC processor circuit, such as processor circuit 100 of FIG. 1A. In CISC processors that process fine-grained data, data dependencies/hazards are detected and resolved on a finer-granularity level than the complete coarse-grained data structures (e.g., rows of a matrix, columns of a table), which reduces stall cycles, but is more complex and has a higher implementation cost. In CISC processors that process coarse-grained data, data dependencies/hazards are detected and resolved on the same granularity as the coarse-grained data structures (i.e., a stall is performed for the complete matrix/vector to be produced). In general, hazards can be detected at various levels of granularity. For example, hazard detection circuits can detect hazards as coarse-grained (e.g., detect a hazard for an entire matrix and stall an operation for the complete matrix to be produced), medium-grained (e.g., detect a hazard for each subset of a matrix and stall an operation for the dependent subset to be produced), and fine-grained (e.g., detect a hazard for each element of a matrix and stall an operation for the dependent element to be produced). The tradeoffs between these granularities are that coarse-grained hazard detection and resolution has simpler and less resources to implement (e.g., no need to track completion of individual matrix elements and check only completion of the entire matrix). However, coarse-grained hazard detection and resolution may induce more operation stalls (e.g., a hazard on only the last element of a matrix may require stalling until the entire matrix is produced).

In FIG. 1C, front-end circuit 101A processes an application program that includes at least two instructions Inst1 and Inst2. The two instructions Inst1 and Inst2 implement the equation $R=[(X*W1)+Y]*W2$. In this equation, W1 and W2 are matrices, and X and Y are vectors. Instruction Inst1 includes operations 151-153, and instruction Inst2 includes operations 154-156. Operation 151 is a matrix-vector multiplication (MVM) of matrix W1 and vector X that is executed by processing element 112A. Operation 152 is the addition of vector Y and the result of the multiplication of W1 and X performed in operation 151. Operation 152 is executed by processing element 112B. The result of the addition performed by processing element 112B in operation 152 is a vector Z. In operation 153, processing element 112C performs a write back (WB) of vector Z to a register file RF0 in processing element 112A through write back path 170. Write back path 170 may be, for example, a bus that transmits signals.

The processor circuit of FIG. 1C includes hazard detection circuits that detect and resolve data dependencies between operations in the same instruction by stalling a first operation in the instruction that is dependent on a result from a second operation in the same instruction, until the first operation is completed. The hazard detection circuits detect that operation 152 has a data dependency D1 on the result of operation 151. In response to detecting data dependency D1, the hazard detection circuits stall operation 152, until operation 151 is completed, and the result of operation 151 is provided from processing element 112A to processing element 112B. After the result of operation 151 is provided to processing element 112B, the hazard detection circuits allow processing element 112B to perform operation 152.

The processor circuit of FIG. 1C also detects and resolves data dependencies between operations in different instructions using instruction tagging. Instruction tagging on coarse-grained operations in the instructions is an example of coarse-grained hazard detection and resolution. The processor circuit of FIG. 1C includes a compiler that statically tags each of the instructions in the application program processed by front-end circuit 101A. The processor circuit uses the tags to keep track of data dependencies between operations in different instructions in the application program. The compiler assigns each operation having a data dependency on an operation in a different instruction with a unique tag. For example, in FIG. 1C, the processor circuit assigns each of the operations 151, 152, and 155 with a tag value of [0]. Operation 155 is a no operation (NOP). Operation 154 is a matrix-vector multiplication (MVM) of matrix W2 and vector Z in instruction Inst2 that is executed by processing element 112A. The processor circuit assigns operation 154 with a tag value of [1], because the processor circuit detects that operation 154 has a data dependency D2 on the result (vector Z) of operation 152, as shown in FIG. 1C.

The processor circuit of FIG. 1C also includes an instruction retirement counter circuit 160. The instruction retirement counter circuit 160 monitors the progress of the application program and generates a tag value on bus 161 that indicates the last completed instruction in the application program processed by processing elements 112.

The counter circuit 160 updates the tag value on bus 161 after each instruction has completed. The tag value is provided to processing elements 112A-112B through bus 161. The counter circuit 160 may, for example, increment a count value on bus 161 in response to receiving signals on write back path 170 from one of the processing elements 112 (e.g., processing element 112C) indicating that an instruction has completed and architectural states have been updated. Initially, the tag value on bus 161 is 0. In response to the tag value on bus 161 being 0, processing elements (PEs) 112 are permitted to execute operations assigned a tag value of [0], including operations 151, 152, and 155. After processing element (PE) 112C indicates that instruction Inst1 has completed in write back signals on path 170, counter circuit 160 increments the tag value on bus 161 to 1. In response to the tag value on bus 161 being 1, PEs 112 are permitted to execute operations assigned a tag value of [1], including operation 154. In operation 156, PE 112C performs a write back of the result R of equation $R=[(X*W1)+Y]*W2$ to a register file RF1 in PE 112B through write back path 170.

The hazard detection techniques disclosed herein can be used to identify data dependencies among coarse-grained instructions within the same program for correctness. Processor circuits, such as CISC processor circuits, can detect when coarse-grained instructions have no data dependencies. The instructions that have been identified to have no hazards can be scheduled and executed out-of-order to enhance performance and increase efficiency. According to a specific example, a coarse-grained complex instruction set computing (CG-CISC) processor circuit can identify the instructions in a program that have no hazards and can then schedule and execute these instructions out-of-order to enhance performance and increase efficiency.

Figure 2:
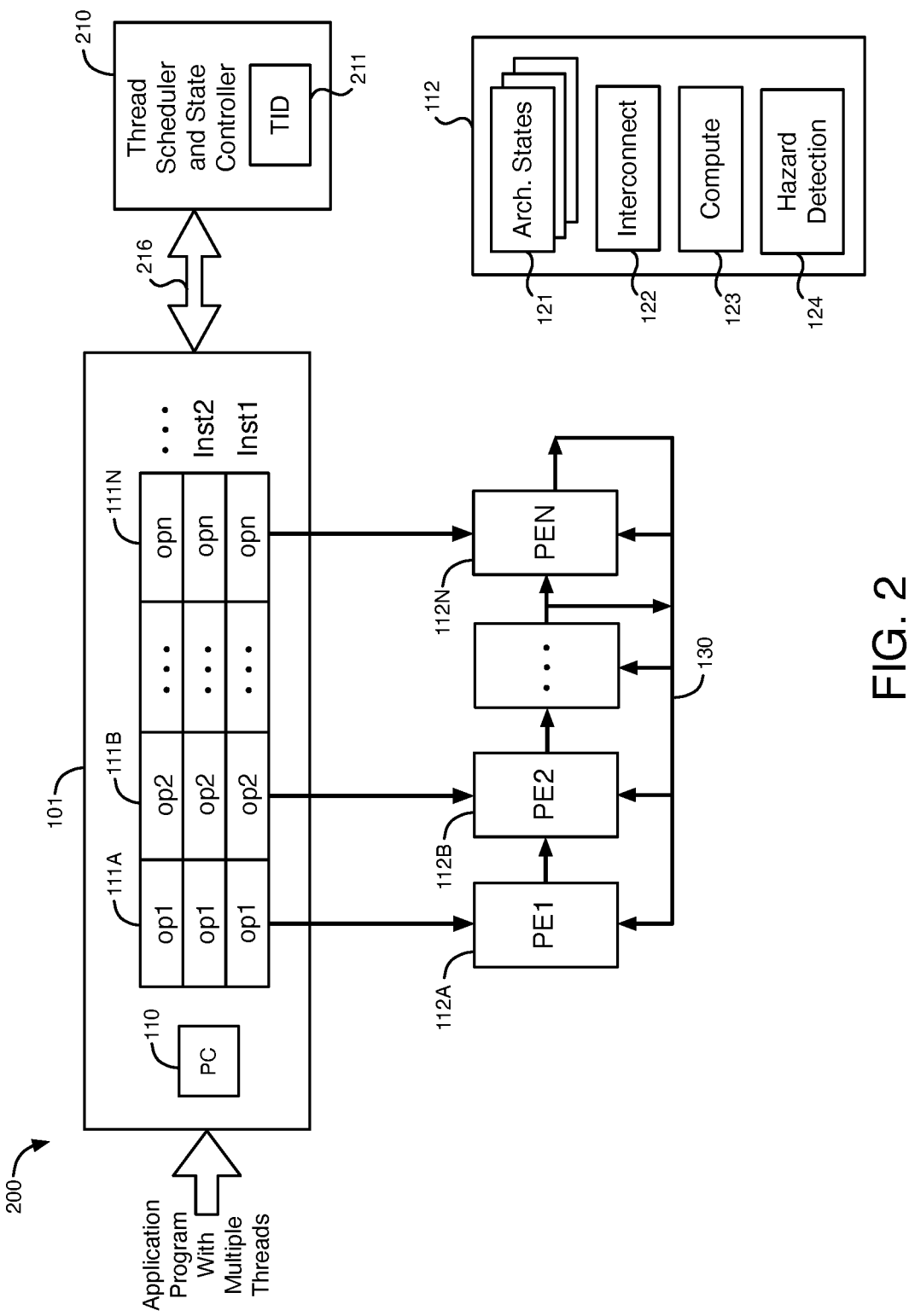
FIG. 2 is a diagram that illustrates an example of a processor circuit that can process multiple threads of a software application program concurrently (i.e., multi-threading).

FIG. 2 is a diagram that illustrates an example of a processor circuit 200 that can process multiple threads of a software application program concurrently (i.e., multi-threading). Processor circuit 200 may be, for example, a coarse-grained Complex Instruction Set Computer (CG-CISC) processor circuit or another type of processor circuit. Processor circuit 200 may be in any type of integrated circuit (IC), such as a programmable integrated circuit (IC), a microprocessor, a graphics processing unit (GPU), an application specific IC (ASIC), etc.

Processor circuit 200 includes only one front-end circuit 101 that performs front-end processing for one software application program. As with the example of FIG. 1A, front-end circuit 101 includes a program counter 110 and multiple instructions (such as instructions Inst1, Inst2, etc.) that each include multiple operations 111A, 111B, . . . 111N. Program counter 110 schedules instructions for the application program.

Processor circuit 200 also includes a back-end that includes an N number of processing elements (PEs) 112A, 112B, . . . 112N coupled in a chain and through write back paths 130, as with the example of FIG. 1A. The processing elements 112 process corresponding operations from the instructions in the program on front-end circuit 101.

In the example of FIG. 2, the application program on front-end circuit 101 includes multiple threads (e.g., threads of an ML or AI application program). Each of these threads processes a sequence of the instructions (such as Inst1, Inst2, . . . ) in the program using a different set of data (e.g., coarse-grained data). For example, a first thread may process a set of the instructions in a program using a first set of data, and a second thread may process the same set of the instructions in the program using a second set of data. In this example, the first set of data is different than the second set of data. In the multi-threading example of FIG. 2, all of the threads are executing the same set of instructions on different sets of input data (e.g., one AI/ML algorithm and multiple inference inputs).

Processor circuit 200 also includes a thread scheduler and state controller circuit 210. The thread scheduler and state controller (TSSC) circuit 210 may include firmware that determines which of the threads in the program on front-end circuit 101 are to be processed by the processing elements 112. TSSC circuit 210 includes a thread identification (TID) circuit 211 that stores a unique thread identifier for each of the threads in the program on the front-end circuit 101. TSSC circuit 210 provides control signals 216 to the front-end circuit 101 that cause the front-end circuit 101 to provide the operations and instructions for the threads selected by TSSC circuit 210 to the processing elements 112. TSSC circuit 210 may cause different processing elements 112 to execute operations from different threads of the program concurrently, as described below. Front-end circuit 101 may associate each of the operations and/or instructions with one of the thread identifiers so that front-end circuit 101 can keep track of which of the threads are being processed by each one of the processing elements 112. TSSC circuit 210 may have a customizable number of thread contexts and/or scheduling schemes for scheduling the execution of the threads.

TSSC circuit 210 may cause the processing elements 112 to process operations from two or more of the threads concurrently to improve the efficiency of processor circuit 200, as long as the operations processed do not have data dependencies on each other. As a specific example, processing element 112A may process a first operation op1 from a first thread in the program, processing element 112B may process a second operation op2 from a second thread in the program, and processing element 112N may process an Nth operation op*n* from an Nth thread in the program concurrently with PE 112A processing operation op1 from the first thread and PE 112B processing operation op2 from the second thread. TSSC 210 may have a separate program counter for each thread, and TSSC 210 may switch the program counter 110 in the front-end circuit 101 between threads when the context is switched from one thread to another thread.

As with the example of FIG. 1A, each of the processing elements 112 of processor circuit 200 includes a hazard detection circuit 124 that detects and resolves data dependencies (e.g., hazards) between an operation being executed on the processing element and other operations in the same thread or in other threads in an application program. The hazard detection circuits 124 in the processing elements 112 generate control signals that indicate any potential data dependencies between the operations and threads processed by processing elements 112 and any other operations/ threads. The hazard detection circuits 124 exchange these control signals with each other between the processing elements 112 to detect and resolve data dependencies between the operations and threads being processed by processing elements 112. The hazard detection circuits 124 control the sequence of the execution of the operations and threads being processed by processing elements 112 to resolve any data dependencies. The hazard detection circuits 124 can, for example, stall one or more of the operations or threads that have a data dependency on another operation or thread being processed or that has not yet been processed (e.g., that requires data generated by another operation), until that other operation or thread has completed.

The processing elements 112 of FIG. 2 also include architectural states 121 that are shared between multiple threads, interconnect resources 122 that are shared between the threads, and compute resources 123 that are shared between the threads. Multi-threading improves efficiency by such sharing of compute and interconnect resources.

Figure 3:
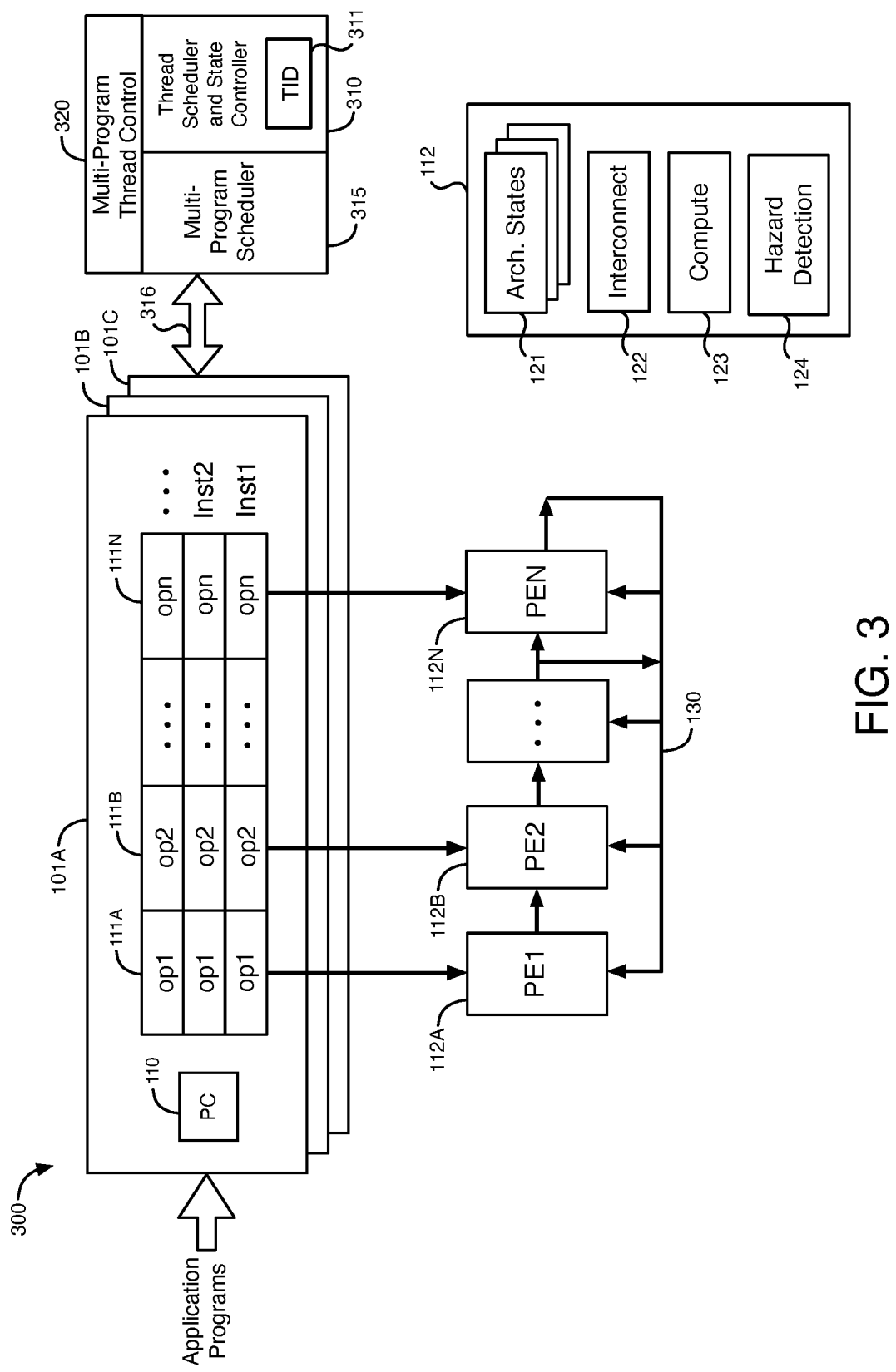
FIG. 3 is a diagram that illustrates an example of a processor circuit that can process multiple software application programs concurrently (i.e., multi-programming) and that can process multiple threads of a software application program concurrently (i.e., multi-threading).

FIG. 3 is a diagram that illustrates an example of a processor circuit 300 that can process multiple software application programs concurrently (i.e., multi-programming) and that can process multiple threads of a software application program concurrently (i.e., multi-threading). Processor circuit 300 may, for example, provide better efficiency by supporting both multi-programming and multi-threading. Processor circuit 300 may be, for example, a coarse-grained Complex Instruction Set Computer (CG-CISC) processor circuit or another type of processor circuit. Processor circuit 300 may be in any type of integrated circuit (IC), such as a programmable IC, a microprocessor, a GPU, an ASIC, etc.

As with the example of FIG. 1A, processor circuit 300 includes multiple front-end circuits 101 and a back-end circuit that includes multiple processing elements 112. Each of the front-end circuits 101A, 101B, 101C, etc. processes a different application program. Each of the front-end circuits 101 performs front-end processing for one of the application programs, as described above with respect to processor circuit 100. Each of the front-end circuits 101 includes a program counter 110 that schedules instructions for one of the programs. The processing elements 112 execute operations in the instructions received from the front-end circuits 101, as described above with respect to processor circuit 100. Each of the processing elements 112 processes an operation in one of the instructions.

Each of the application programs on front-end circuits 101 includes multiple threads that each process a different set of data. Each of the threads in one application program may process the same sequence of instructions. Each of the instructions includes multiple operations. Processor circuit 300 includes support for the architectural states 121 of multiple program contexts, shared interconnect resources 122, and shared compute resources 123 in each of PEs 112.

Processor circuit 300 includes a multi-program thread control circuit block 320 that includes a multi-program scheduler circuit 315 and a thread scheduler and state controller circuit 310. Multi-program scheduler circuit 315 determines which of the application programs on front-end circuits 101 are to be processed by each of the processing elements 112. Thread scheduler and state controller (TSSC) circuit 310 determines which of the threads are to be processed by each of the processing elements 112. TSSC circuit 310 includes a thread identification (TID) circuit 311 that stores a unique thread identifier for each of the threads in each of the programs on front-end circuits 101. Multi-program thread control circuit block 320 provides control signals 316 to the front-end circuits 101 to cause the front-end circuits 101 to provide the operations for the threads selected by circuit 310 in the programs selected by circuit 315 to the processing elements 112. Block 320 may cause different processing elements 112 to execute operations from two or more threads in two or more programs concurrently, as long as the operations processed do not have data dependencies on each other. For example, processing element 112A may process a first operation op1 from a first thread in the first program managed by front-end circuit 101A, processing element 112B may process a second operation op2 from a second thread in the second program managed by front-end circuit 101B, and processing element 112N may process an operation from a thread in a program managed by front-end circuit 101C concurrently with PE 112A processing operation op1 from the first thread and PE 112B processing operation op2 from the second thread. Front-end circuits 101 may associate each of the operations and/or instructions with one of the thread identifiers so that circuits 101 can keep track of which of the threads are being processed by the processing elements 112. Multi-program thread control circuit block 320 may have a customizable number of program contexts, thread contexts, and/or scheduling schemes for scheduling the execution of the programs and threads.

As with the examples of FIGS. 1A-2, each of the processing elements 112 of processor circuit 300 includes a hazard detection circuit 124 that detects and resolves data dependencies (e.g., hazards) between a current operation executing on the processing element and other operations being processed by the other processing elements 112. In processor circuit 300, the hazard detection circuits 124 in the processing elements 112 detect and resolve data dependencies between the operations in different threads and in different programs that are being processed by processing elements 112. The hazard detection circuits 124 control the sequence of the execution of the operations, instructions, threads, and programs being processed by processing elements 112 to resolve the data dependencies.

Figure 4:
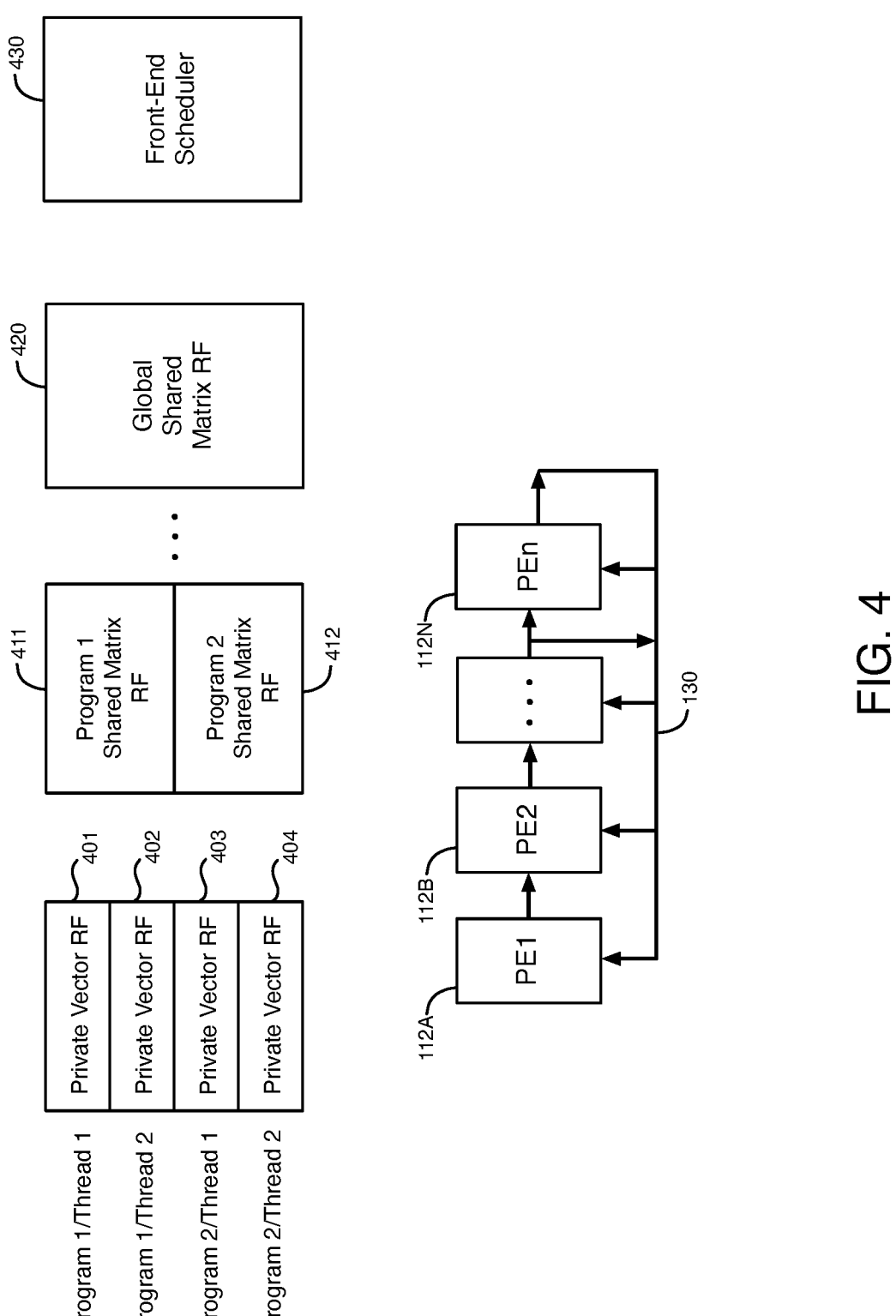
FIG. 4 illustrates examples of state sharing between multiple programs and multiple threads that are executed by a processor circuit that can support multi-programming and multi-threading, such as the processor circuit of FIG. 3.

As discussed above with respect to FIGS. 1A-3, architectural states may be shared between multiple programs and between multiple threads with one or more of the programs that are processed by a processor circuit. FIG. 4 illustrates examples of state sharing between multiple programs and multiple threads that are executed by a processor circuit that can support multi-programming and multi-threading, such as processor circuit 300 of FIG. 3. In the example of FIG. 4, a first front-end circuit 101A in processor circuit 300 performs front-end processing for a first program 1, and a second front-end circuit 101B in processor circuit 300 performs front-end processing for a second program 2. Each of the first and second programs has at least two threads (e.g., thread 1 and thread 2). The processor circuit 300 includes register files (RF) that support sharing between the architectural states of the programs and the threads in each of the programs. Processor circuit 300 also includes a front-end scheduler circuit block 430 that manages the customized sharing between the architectural states of the programs and the threads in each of the programs.

In the example of FIG. 4, the threads 1 and 2 in each of the programs 1 and 2 perform operations that use vectors and matrices. Threads 1 and 2 in program 1 have architectural states for private vectors that are stored in register files (RF) 401 and 402, respectively. Threads 1 and 2 in program 2 have architectural states for private vectors that are stored in register files (RF) 403 and 404, respectively. The operations in thread 1 in program 1, thread 2 in program 1, thread 1 in program 2, and thread 2 in program 2 have access to the architectural states for the private vectors stored in the register files 401, 402, 403, and 404, respectively.

The architectural states for one or more shared matrices of the threads (e.g., threads 1 and 2) in program 1 are stored in register files (RF) 411. Each of the threads (e.g., threads 1 and 2) in program 1 has access to the architectural states for a shared matrix (or multiple shared matrices) stored in RF 411. The architectural states for one or more shared matrices of the threads (e.g., threads 1 and 2) in program 2 are stored in the register files (RF) 412. Each of the threads (e.g., threads 1 and 2) in program 2 has access to the architectural states for a shared matrix (or multiple shared matrices) stored in RF 412. The architectural states for one or more matrices that are globally shared between multiple threads (e.g., threads 1 and 2) in multiple programs (e.g., programs 1 and 2) executed by processor circuit 300 are stored in register files (RF) 420. Each of the threads (e.g., threads 1 and 2) in each of the programs (e.g., programs 1 and 2) executed by processor circuit 300 has access to the architectural states for a globally shared matrix (or multiple globally shared matrices) stored in RF 420. The shared matrices stored in register files 411-412 and 420 may contain data that needs to be accessed by multiple threads in one or more different programs (e.g., by multiple neural network threads in AI/ML programs). Front-end scheduler 430 coordinates accesses to the vectors and matrices stored in register files 401-404, 411-412, and 420 to prevent collisions between data accesses by different operations. The sharing of architectural states as needed by the workloads of the programs and as implemented by front-end scheduler 430 improves the efficiency of the processor circuit and reduces memory resource utilization.

According to other examples disclosed herein, a processor system designer is provided that automatically generates custom processor circuits using custom specifications for the processor circuits and custom workloads for programs to be run on the processor circuits. The processor system designer allows for easier and faster creation of new specialized processor circuits for different application programs. The processor system designer can also be used to create processor circuits for different workloads of application programs. The processor system designer may be used to generate a coarse-grained (CG) CISC processor circuits or any other type of processor circuits.

Figure 5:
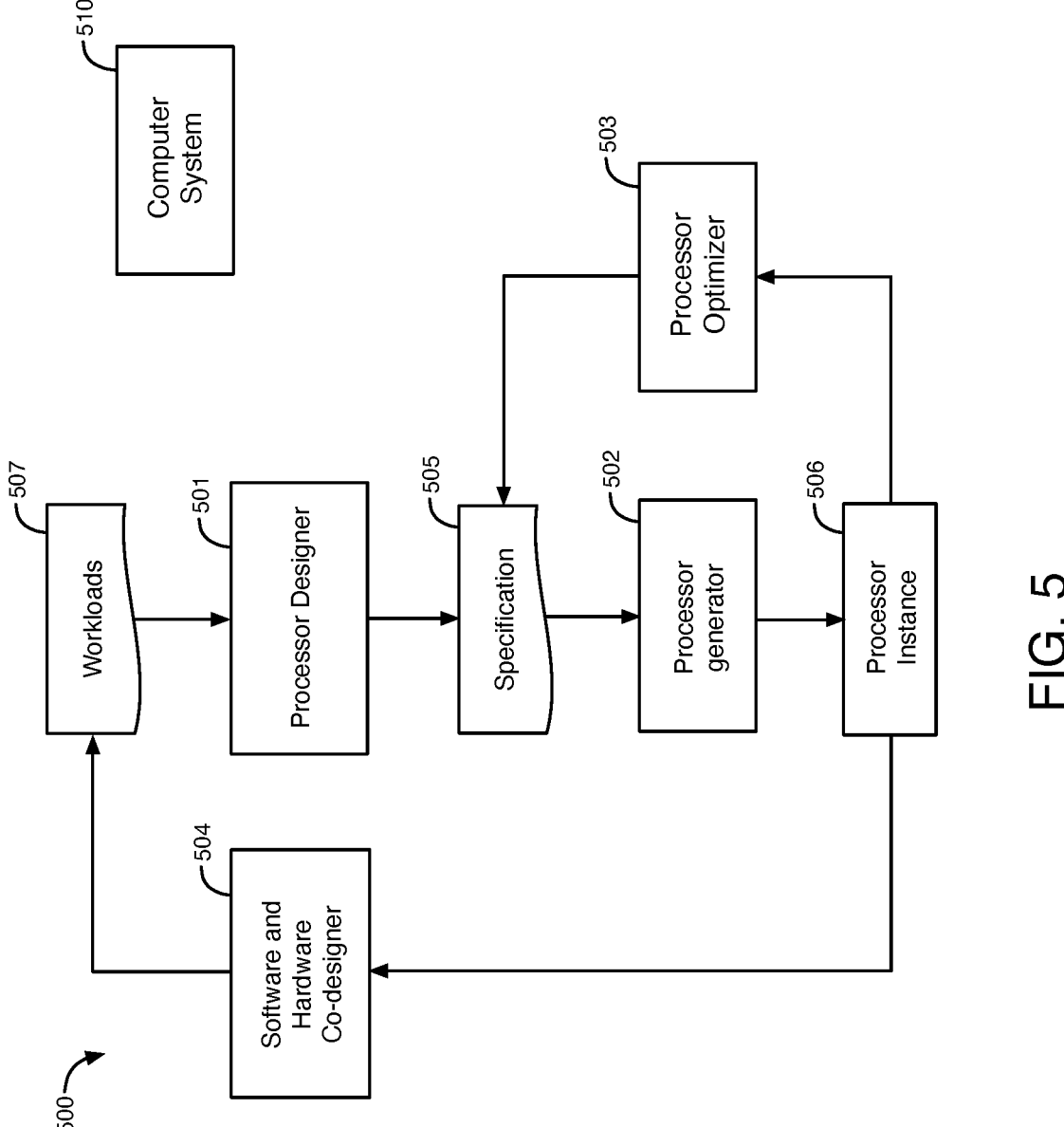
FIG. 5 is a system level diagram of an example of a processor generator system that can generate one or more custom processor circuits.

FIG. 5 is a system level diagram of an example of a processor generator system 500 that can generate one or more custom processor circuits. The processor generator system 500 of FIG. 5 includes a processor designer 501, a processor generator 502, a processor optimizer 503, and a software and hardware co-designer 504. Each of these systems 501-504 may, for example, be implemented by one or more software program tools running on a computer system 510. The processor circuits generated by system 500 may be implemented, for example, in soft logic and/or in hard logic in a programmable logic IC, a microprocessor, a GPU, etc.

Processor generator system 500 can generate a design for a processor circuit using target workloads 507 for a software application program (e.g., an ML/AI or database program) to be run on the processor circuit. The workloads 507 refer to processor workloads that may, for example, indicate the number of instructions being executed by a processor circuit during a given period of time or at a particular time. Workload statistics may, for example, indicate a need for an increase in processing power if the processor circuit is overloaded, or a decrease in processing power if the processor circuit use falls below a certain threshold. Processor designer 501 can extract characteristics of the software application program to be run on the processor circuit using the workloads 507 to create specifications 505 for the processor circuit within the domain of the software application program. The specifications 505 may include hardware and software specifications that are used to design the processor circuit. The specifications 505 generated by the processor designer 501 are provided to processor generator 502. Processor generator 502 can automatically create an instance 506 of the processor circuit using the specifications 505 that are generated by processor designer 501. The instance 506 of the processor circuit may, for example, include a hardware design for the processor circuit, software for the processor circuit, and verification tools for the processor circuit.

The processor instance 506 is provided to the processor optimizer 503. Processor optimizer 503 can optimize the instance 506 of the processor circuit, for example, by removing, adding, extending, and/or changing hardware blocks in the processor instance 506 using customizable rules. Processor optimizer 503 can modify the specifications 505 based on the modified and optimized instance of the processor circuit. Processor generator 502 can then automatically recreate another instance 506 of the processor circuit using the modified specifications 505 that are generated by processor optimizer 503.

The processor instance 506 (and each modified processor instance 506) generated by the processor generator 502 is provided to the software and hardware co-designer 504. The software and hardware co-designer 504 can use the processor instance 506 to modify the software application program to be run on the processor circuit to generate a more optimal software application program. The software and hardware co-designer 504 can modify workloads 507 based on the modified software application program. The processor designer 501 can then modify the specifications 505 based on the modified workloads 507. The processor generator 502 can then use the modified specifications 505 to generate a modified processor circuit instance 506 having a more optimal hardware design for the processor circuit. Further details of the system 500 of FIG. 5 are disclosed herein with respect to FIGS. 6-9.

Figure 6:
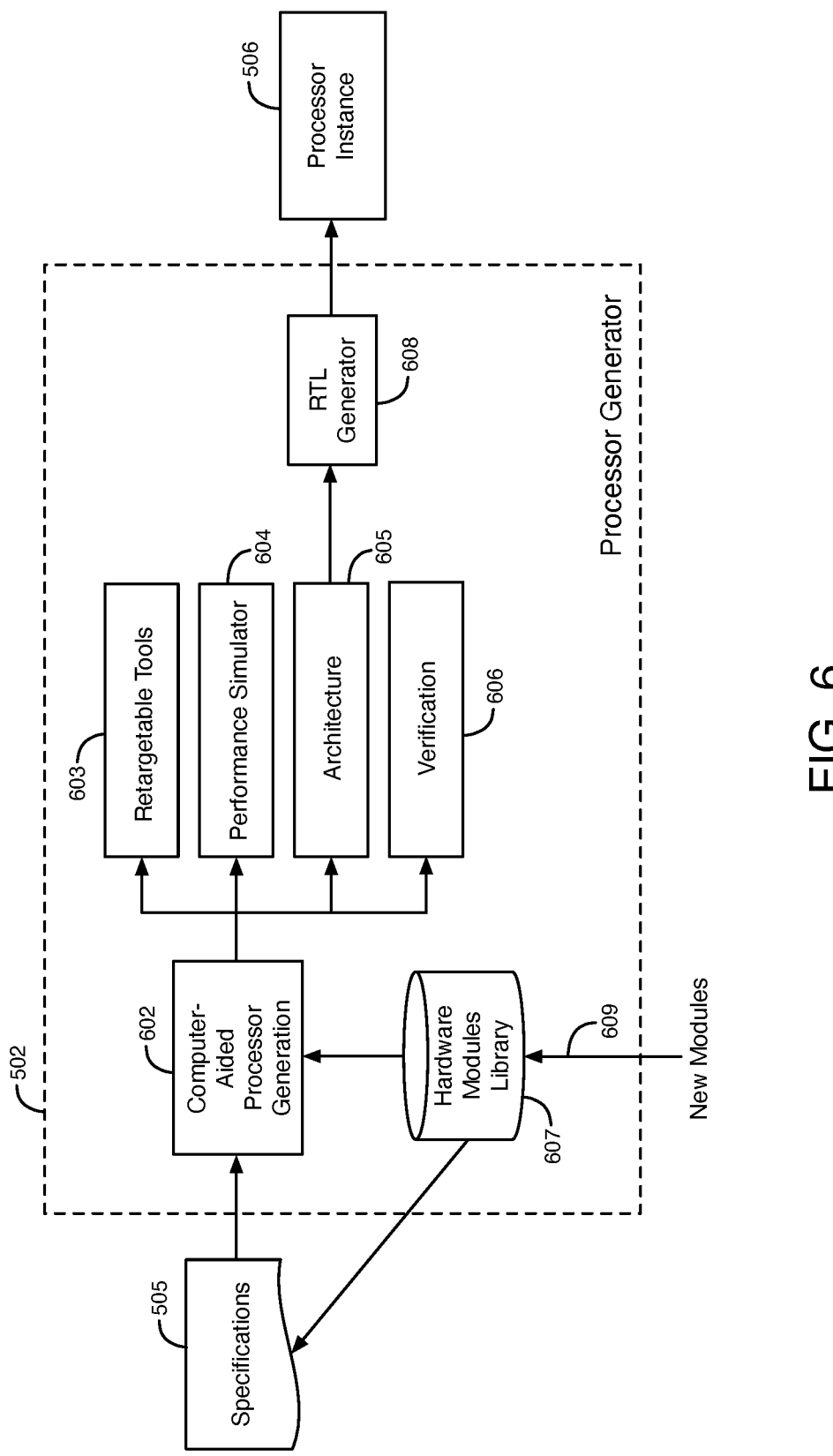
FIG. 6 is a diagram that illustrates further details of an example of an implementation of the processor generator in the system of FIG. 5.

FIG. 6 is a diagram that illustrates further details of an example of an implementation of the processor generator 502 in the system 500 of FIG. 5. Processor generator 502 receives specifications 505 for a processor circuit. The specifications 505 may include, for example, processor instruction sets, processor architectural states (e.g., including states for vectors and matrices), processor functional units, processor architecture templates, and interconnections between the functional units. The specifications 505 may, for example, be provided in an architecture description language. The specifications 505 may be selected for a particular application domain, for example, an AI/ML program, a database, a video processing application, etc.

In the example of FIG. 6, the processor generator 502 includes a computer-aided processor generation (CAPG) block 602 that receives the specifications 505. Block 602 uses the specifications 505 and hardware modules accessed from a library 607 to design a hardware instance of a processor circuit, for example, with a computer-aided design (CAD) tool. The hardware module library 607 can also be updated with new modules by external user input as shown in FIG. 6 by arrow 609 (e.g., when one or more new modules are created for a new application domain). The hardware modules (e.g., circuit blocks or libraries) in library 607 may also be referred to in specifications 505. Block 602 selects an architecture 605 (e.g., a hardware architectural design) for the processor circuit based on the specifications 505 and based on hardware modules from library 607. The architecture 605 selected for the processor circuit may include hardware blocks (i.e., circuit blocks) selected based on the hardware modules. The architecture 605 may include, for example, hard and/or soft logic to implement one or more of the hardware blocks. Block 602 may, for example, select the architecture 605 for the processor circuit based on the particular application domain used to generate the specifications 505. The architecture 605 that block 602 selects for the processor circuit may, for example, include functional blocks that implement the instruction set and that have composable interfaces. Block 602 may, for example, connect the functional blocks using interconnection information in specifications 505. Selecting functional blocks having composable interfaces to implement the processor circuit ensures that the functional blocks can operate together and can be modified or moved without having to completely redesign the processor circuit. Block 602 can, for example, ensure that all of the functional blocks in the processor circuit have composable interfaces.

Block 602 outputs the selected architecture 605 for the processor circuit, retargetable tools 603, a performance simulator 604, and a verification tool 606. The retargetable tools 603 may include, for example, a debugger and a compiler for the processor circuit having architecture 605. The performance simulator 604 includes a software tool that simulates the performance of the processor circuit having architecture 605. The verification tool 606 includes a software tool that verifies the operation of the processor circuit having architecture 605 using test vectors. Software tools 603-604 and 606 may, for example, be different for different processor architectures.

The selected architecture 605 for the processor circuit is provided to a register transfer level (RTL) generator block 608. RTL generator block 608 generates an RTL file for the selected architecture 605 for the processor circuit. The RTL file includes a register transfer level (RTL) design abstraction (e.g., in a hardware description language) that defines digital portions of the design for the architecture 605 of the processor circuit. RTL generator 608 outputs the RTL file for the selected architecture 605 as the processor instance 506.

Figure 7:
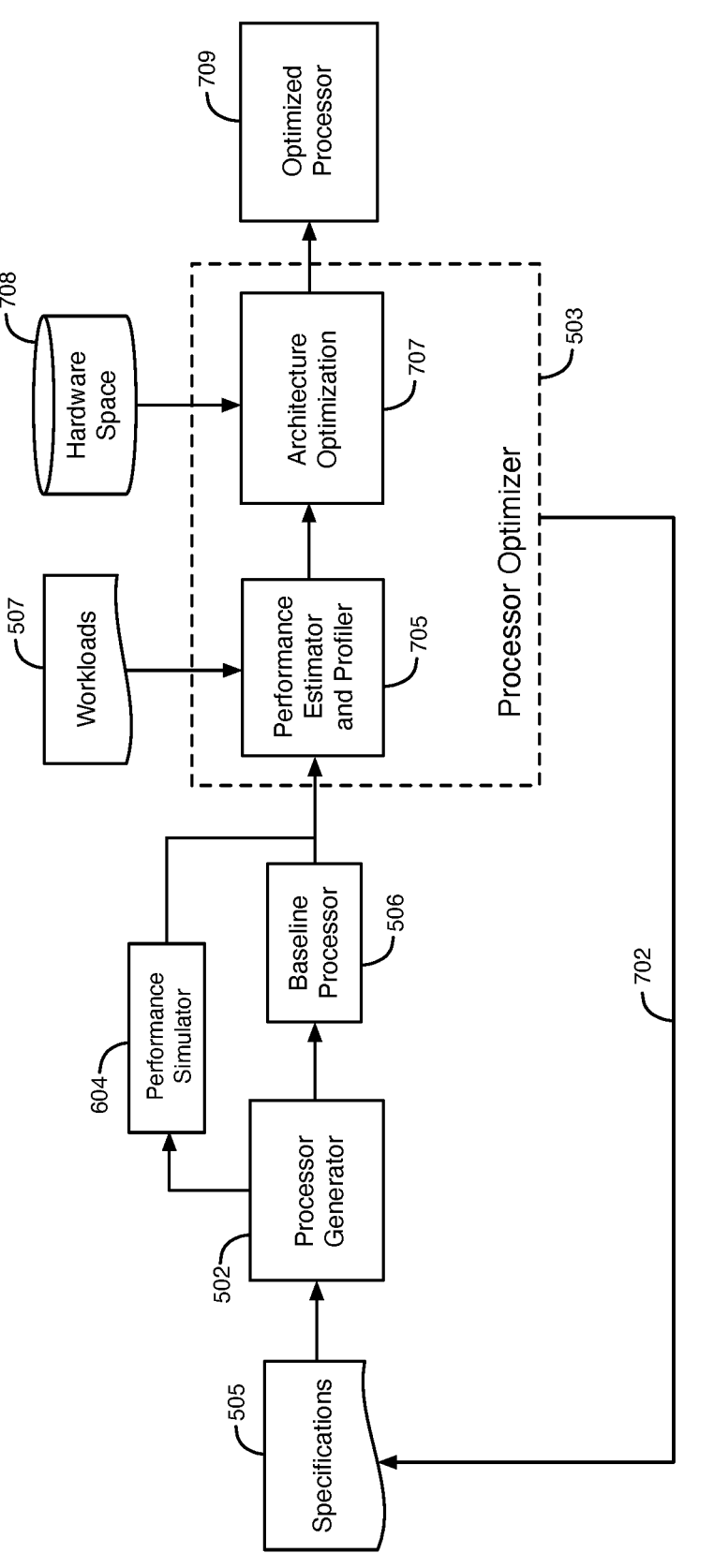
FIG. 7 is a diagram that illustrates further details of an example of an implementation of the processor optimizer in the system of FIG. 5.

FIG. 7 is a diagram that illustrates further details of an example of an implementation of the processor optimizer 503 in the system 500 of FIG. 5. In the example of FIG. 7, processor optimizer 503 automatically locates an optimal processor architecture for a set of target workloads 507 using processor instance 506 (also referred to as baseline processor instance 506). Processor optimizer 503 includes a performance estimator and profiler 705 and an architecture optimization block 707. As described above with respect to FIG. 6, processor generator 502 generates a processor instance 506 having the selected architecture 605 using the specifications 505. The baseline processor instance 506 is provided to the performance estimator and profiler 705 in processor optimizer 503. Performance simulator 604 simulates the performance of the processor circuit instance 506 having architecture 605 to generate performance results. The performance results generated by performance simulator 604 are provided to the performance estimator and profiler 705.

The performance estimator and profiler block 705 generates compute graphs from workloads 507. Block 705 obtains the baseline processor instance 506 and simulation traces from the performance simulator 604. Block 705 then identifies bottlenecks in the workload compute graphs and simulation traces. Then, the architecture optimization block 707 optimizes the baseline processor instance 506 to generate an optimized processor circuit instance 709, for example, by removing, adding, extending, modifying, and/or changing hardware blocks in the baseline processor instance 506 to reduce the bottlenecks in the workload compute graphs and simulation traces identified by the performance estimator and profiler block 705 using the constraints of the hardware space 708. The hardware blocks may be, for example, processing elements 112 or sub-blocks of processing elements 112. The hardware space 708 may, for example, indicate details of the target device for the processor circuit, such as whether the target device is a programmable logic IC, a microprocessor, a GPU, an ASIC, etc. Architecture optimization block 707 may, for example, contain optimization algorithms that operate on graphs of the composable functional blocks in architecture 605 to generate the optimized processor circuit instance 709.

After the optimized processor circuit instance 709 is generated, processor optimizer 503 can modify the specifications 505 based on the modified and optimized processor circuit instance 709 through a feedback path 702. For example, processor optimizer 503 can modify the instruction set, the functional units, or the architectural states of the specifications 505. Processor generator 502 can then automatically recreate another processor circuit instance 506 using the modified specifications 505 that are generated by processor optimizer 503. The processor generator system 500 can run as many iterations of the loop shown in FIG. 7 as needed to optimize the optimized processor circuit instance 709. Processor optimizer 503 provides improved processor circuit efficiency when optimizing for a set of workloads.

Figure 8:
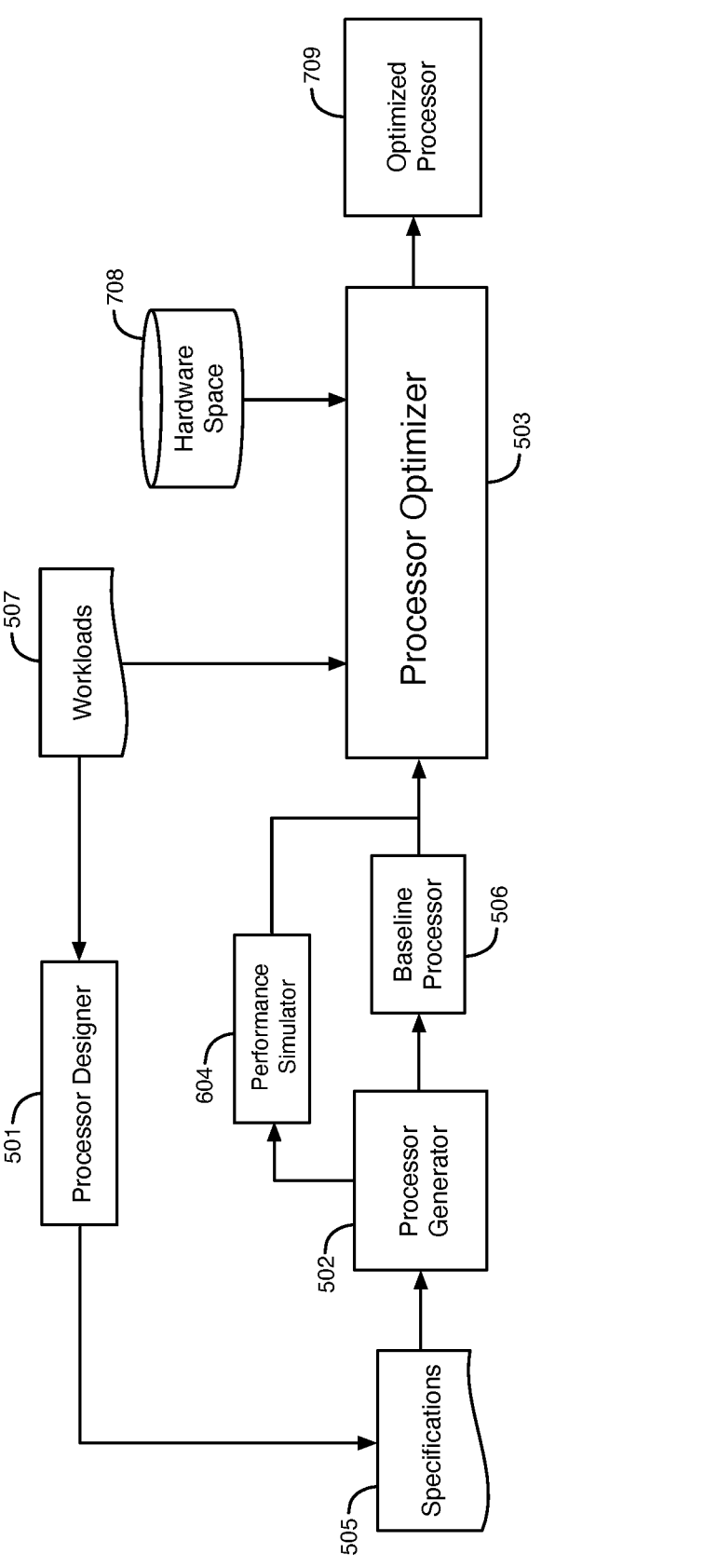
FIG. 8 is a diagram that illustrates further details of an example of an implementation of the processor designer in the system of FIG. 5.

FIG. 8 is a diagram that illustrates further details of an example of an implementation of the processor designer 501 in the system 500 of FIG. 5. FIG. 8 shows several blocks that are also shown in FIG. 7 including specifications 505, processor generator 502, baseline processor instance 506, performance simulator 604, processor optimizer 503, workloads 507, hardware space 708, and optimized processor instance 709. These blocks function as described above with respect to FIG. 7.

In the example of FIG. 8, the processor designer 501 automatically generates design specifications 505 for a processor circuit from a set of workloads 507 using a systematic workload analysis algorithm. The workloads 507 may be for a particular application program (e.g., a neural network) or a category of application programs (e.g., AI or ML programs) that are to be run on the processor circuit being generated by system 500. The instructions and operations used by the application program or category of application programs can be used to create the workloads 507 that are used by processor designer 501. The workloads 507 used by processor designer 501 to create the specifications 505 may also include graphs of computation types to be performed by the application program or category of programs. Processor designer 501 automatically generates the specifications 505, including for example, the instruction sets, architectural states, functional units, architectural templates, and interconnections between the functional blocks, for the processor circuit based on the workloads 507 for a particular application program or category of application programs. Processor designer 501 can raise the design abstraction level for the design of the processor circuit to provide an optimal workload-driven design for target workloads 507.

Figure 9:
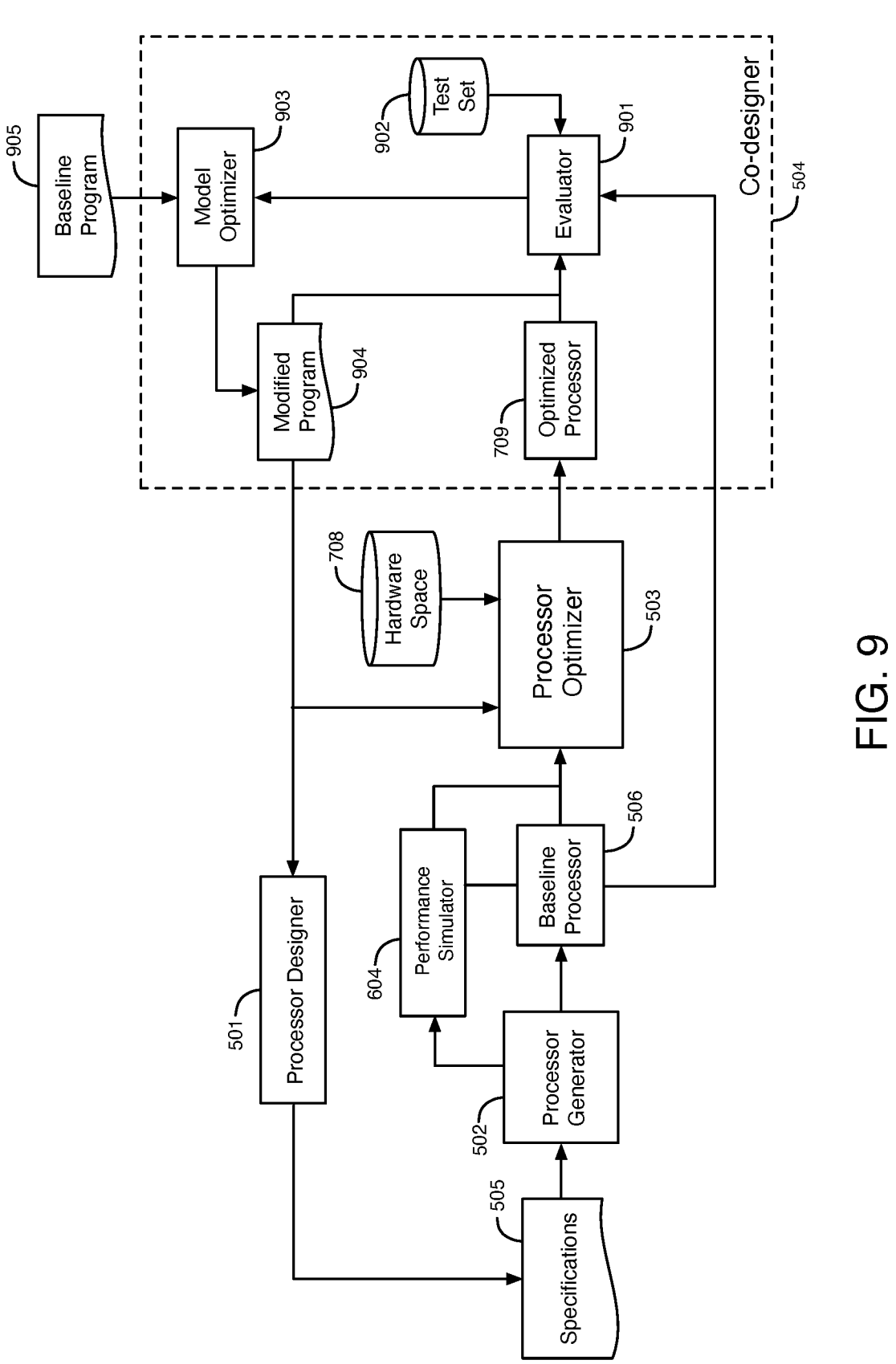
FIG. 9 is a diagram that illustrates further details of an example of an implementation of the software and hardware co-designer in the system of FIG. 5.

FIG. 9 is a diagram that illustrates further details of an example of an implementation of the software and hardware co-designer 504 in the system 500 of FIG. 5. FIG. 9 shows several blocks that are also shown in FIGS. 7-8 including specifications 505, processor generator 502, baseline processor instance 506, performance simulator 604, processor optimizer 503, hardware space 708, processor designer 501, and optimized processor instance 709. These blocks function as described above with respect to FIGS. 7-8.

Co-designer 504 includes an evaluator 901 and a model optimizer 903. Model optimizer 903 receives a baseline software program 905 as an input. Model optimizer 903 adjusts one or more algorithms in the baseline software program 905 to generate a modified and optimized software program 904 that more effectively meets optimization goals. As an example, if the baseline program 905 contains an AI/ML model having a neural network, the model optimizer 903 can modify weights of the nodes or edges, or add/remove layers of the nodes, in the neural network to cause the modified program 904 (e.g., the modified AI model) to satisfy the optimization goals.

The modified program 904, the optimized processor circuit instance 709, a test set 902, the baseline processor circuit instance 506, and the output of the performance simulator 604 are provided to the evaluator 901. The test set 902 is a set of pre-defined test vectors that the evaluator 901 uses to characterize different metrics, such as power usage, efficiency, timing, cost, etc. Evaluator 901 runs the modified program 904 with the modified workloads on the optimized processor circuit instance 709 using a simulator to determine if the modified program 904 satisfies the optimization goals based on statistics generated during the processing of the modified program 904. Evaluator 901 may, for example, identify bottlenecks in the modified program 904 run on the optimized processor circuit instance 709. As another example, evaluator 901 may determine if there are too many layers or nodes in a neural network in an AI/ML model run on instance 709.

Evaluator 901 may generate statistics that indicate comparisons between the operation of the modified program 904 and the optimization goals (e.g., power statistics, timing statistics, etc.). Evaluator 901 may also analyze the baseline processor circuit instance 506 and/or the output of the performance simulator 604 to generate the statistics. Evaluator 901 provides these statistics to the model optimizer 903. The model optimizer 903 can then change one or more algorithms in baseline software program 905 using the statistics received from the evaluator 901 to cause the modified program 904 to more effectively meet the optimization goals. Co-designer 504 can unlock a much larger hardware design space that can, for example, exploit the flexibility of a programmable logic IC.

After model optimizer 903 performs one or more iterations of generating and/or changing the modified program 904, the modified program 904 including the modified workloads are provided to the processor designer 501. The processor designer 501 then automatically changes the design specifications 505 for the processor circuit to generate modified specifications using the modified workloads from the modified program 904. Processor generator 502 and processor optimizer 503 can then perform an additional iteration of the functions disclosed herein with respect to FIGS. 5-7 to generate another optimized processor circuit instance 709 using the modified specifications 505.

According to other examples, a processor circuit designed using any of the techniques disclosed herein may include any combination of hard logic and soft logic in an integrated circuit (IC). As a specific example, elastic first-in-first-out (FIFO) circuits can enable efficient compositions of soft logic for a processor circuit. The FIFO circuits can enable hand-shaking protocols to provide more efficient communication between functional blocks within the processor circuit. Implementing FIFO circuits in a processor circuit in a programmable logic IC, such as an FPGA, can impact the maximum frequency of signals in the processor circuit. As another specific example, data can be transferred between memory circuit blocks and digital signal processing (DSP) circuit blocks in a processor circuit (e.g., matrix register files to dot product engines) through interconnect conductors. As another specific example, data can be transferred between the memory circuit blocks in a processor circuit (e.g., one vector register file to another vector register file) through interconnect conductors. As yet another example, data (e.g., vector or matrix register files) can be transferred between input/output circuits and in-package devices (e.g., high-bandwidth memory devices) or other external devices (e.g., using Ethernet or another transmission protocol). As still another example, a processor circuit may include digital signal processing (DSP) circuit blocks that can be dynamically controlled by the processor circuit to perform different operations. The configuration of DSP circuit blocks can be changed dynamically with processor circuit instructions to adjust the arithmetic precision performed by the DSP circuit blocks for a particular application program run on the processor circuit. The DSP circuit blocks can be composable to scale so that the DSP circuit blocks can process short, medium, or long vectors and small, medium, or large matrices. The DSP circuit blocks can be dynamically configured to adjust the tensor DSP composition to match the data sizes needed by an application workload.

According to other examples, processor circuits generated using any of the techniques disclosed herein can be specialized for transformers for AI models, such as Bidirectional Encoder Representations from Transformers (BERT) or Generative Pre-Training (GPT), for example, by using compute complex transpose units or Gaussian error linear units (GELU). As another example, the processor circuits generated using techniques disclosed herein may be specialized for light-weight convolutional neural networks (CNNs) using compute complex for depth-wise convolutions. As yet another example, the processor circuits may be specialized for AI recommendation systems, such as deep learning recommendation models (DLRMs), using sparse table lookups and embedded computation. As still another example, the processor circuits may be specialized for sparsity, such as structured or unstructured sparsity, various sparse formats, or hardware auto-extract sparsity. As still another example, the processor circuits may be specialized for Ising optimization using random number or stochastic units.

In general, software and data for performing any of the functions disclosed herein (e.g., by the processor circuits or by system 500) may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Figure 10:
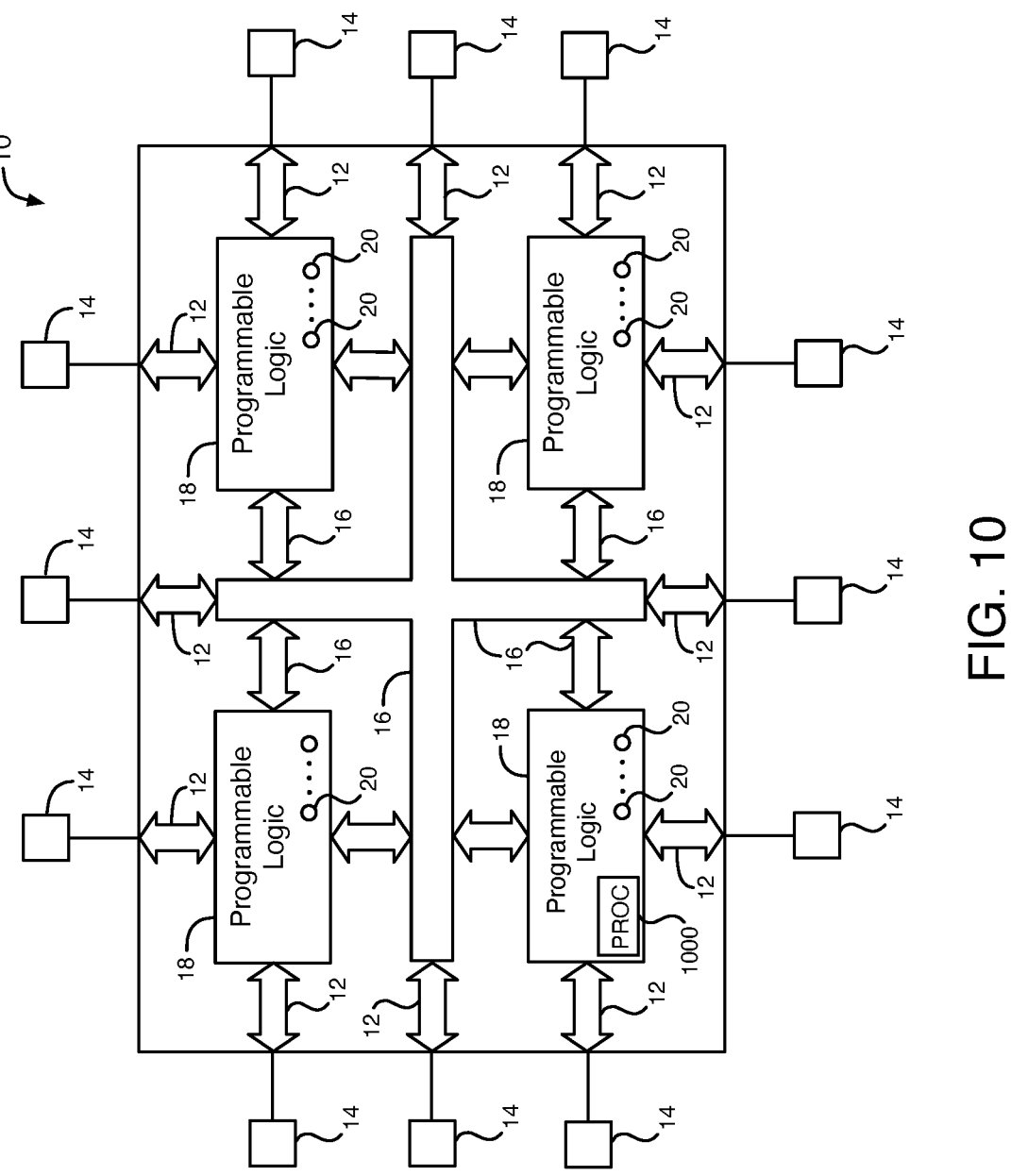
FIG. 10 is a diagram of an illustrative programmable logic integrated circuit (IC) that includes a processor circuit.

An illustrative programmable logic integrated circuit (IC) 10 that includes a processor circuit 1000 is shown in FIG. 10. IC 10 includes 4 regions 18 of programmable logic circuits. In the example of FIG. 10, the region 18 in the lower left corner includes processor circuit 1000. Although one processor circuit (PROC) 1000 is shown in FIG. 10 as an example, IC 10 may have any suitable number of processor circuits. Processor circuit 1000 may be designed according to any of the techniques disclosed herein for designing and creating a processor circuit.

As shown in FIG. 10, programmable logic integrated circuit 10 may have input-output circuitry 12 for driving signals off of IC 10 and for receiving signals from other devices via input-output pads 14. Processor circuit 1000 may use input-output circuitry 12 and input-output pads 14 to provide data to external devices. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). The programmable logic circuitry in regions 18 may include combinational and sequential logic circuitry. The programmable logic circuitry in regions 18 may be configured to perform custom logic functions according to a custom design for IC 10.

Programmable logic IC 10 contains memory elements 20 that can be loaded with configuration data using pads 14 and input-output circuitry 12. Once loaded, the memory elements 20 may each provide a corresponding static control output signal that controls the state of an associated logic component in the programmable logic circuitry in one of regions 18. Typically, the memory element output signals are used to control the gates of metal-oxide-semiconductor (MOS) transistors.

Figure 11:
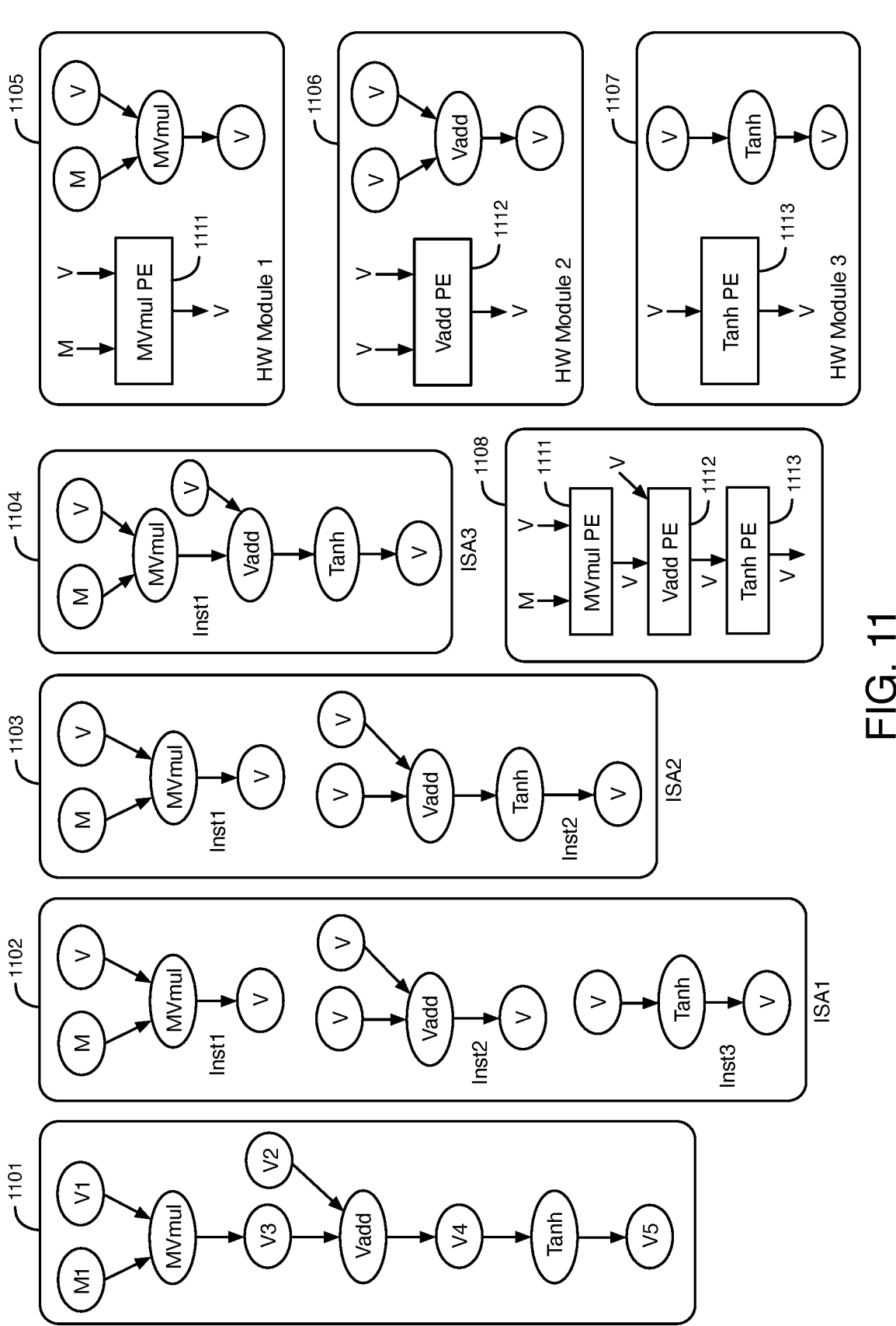
FIG. 11 is a diagram that illustrates an example of an implementation of the processor designer and the processor generator in the processor generator system of FIGS. 5-9.

FIG. 11 is a diagram that illustrates an example of an implementation of the processor designer 501 and the processor generator 502 in processor generator system 500 of FIGS. 5-9. FIG. 11 relates to the following (simplified) example of an application program referred to as my_app1 to be run on a processor circuit created by system 500. In my_app1 as defined (def) below, M1 is a matrix, V1-V5 are vectors, MVmul is multiplication of a matrix M1 times a vector V1 to generate a vector V3, Vadd is the addition of vectors V2 and V3 to generate an output vector V4, and Tanh is an activation function on vector V4 to generate vector V5.

```
def my_app1(M1, V1, V2):
    V3=MVmul(M1, V1);
    V4=Vadd(V2, V3);
    V5=Tanh(V4);
    Return V5
```

Processor designer 501 can extract characteristics of the application program my_app1 using workloads 507 that include a graph 1101 of the computation types to be performed by the application program my_app1. The graph 1101 illustrates the program my_app1 as flow chart that includes the operations MVmul, Vadd, and Tanh using matrix M1 and vectors V1-V5. Processor designer 501 automatically generates specifications 505 for the processor circuit, including for example, three possible instruction sets 1102, 1103, and 1104 for the processor circuit using the information in graph 1101. In instruction set 1102 (ISA1), the operations MVmul, Vadd, and Tanh are separated into three separate instructions Inst1, Inst2, and Inst3, each having separate inputs and outputs. In instruction set 1103 (ISA2), the operation MVmul is provided in a first instruction Inst1, and the operations Vadd and Tanh are provided in a second instruction Inst2. In instruction set 1104 (ISA3), the operations MVmul, Vadd, and Tanh are provided in a single instruction Inst1. In instruction sets 1102-1104, M refers to a matrix, and V refers to a vector.

FIG. 11 also shows examples of 3 hardware (HW) modules 1105-1107 stored in the hardware modules library 607 in processor generator 502. Each of the hardware modules 1105-1107 has an implementation, as well as specifications of interfaces, graphs of supported operations, and other information, such as resource and performance models. As shown in FIG. 11, module 1105 includes a processing element (PE) 1111 that performs operation MVmul, module 1106 includes a PE 1112 that performs operation Vadd, and module 1107 includes a PE 1113 that performs operation Tanh. Each of the modules 1105-1107 also includes an associated graph shown in FIG. 11 for the corresponding operation. Processor generator 502 combines the three modules 1105-1107 from library 607 by matching the graph for instruction set 1104 (with instruction Inst1) with the merged operations graphs of modules 1105-1107 to generate a hardware block 1108, shown in FIG. 11, containing PEs 1111-1113 for a CG-CISC processor circuit.

Figure 12:
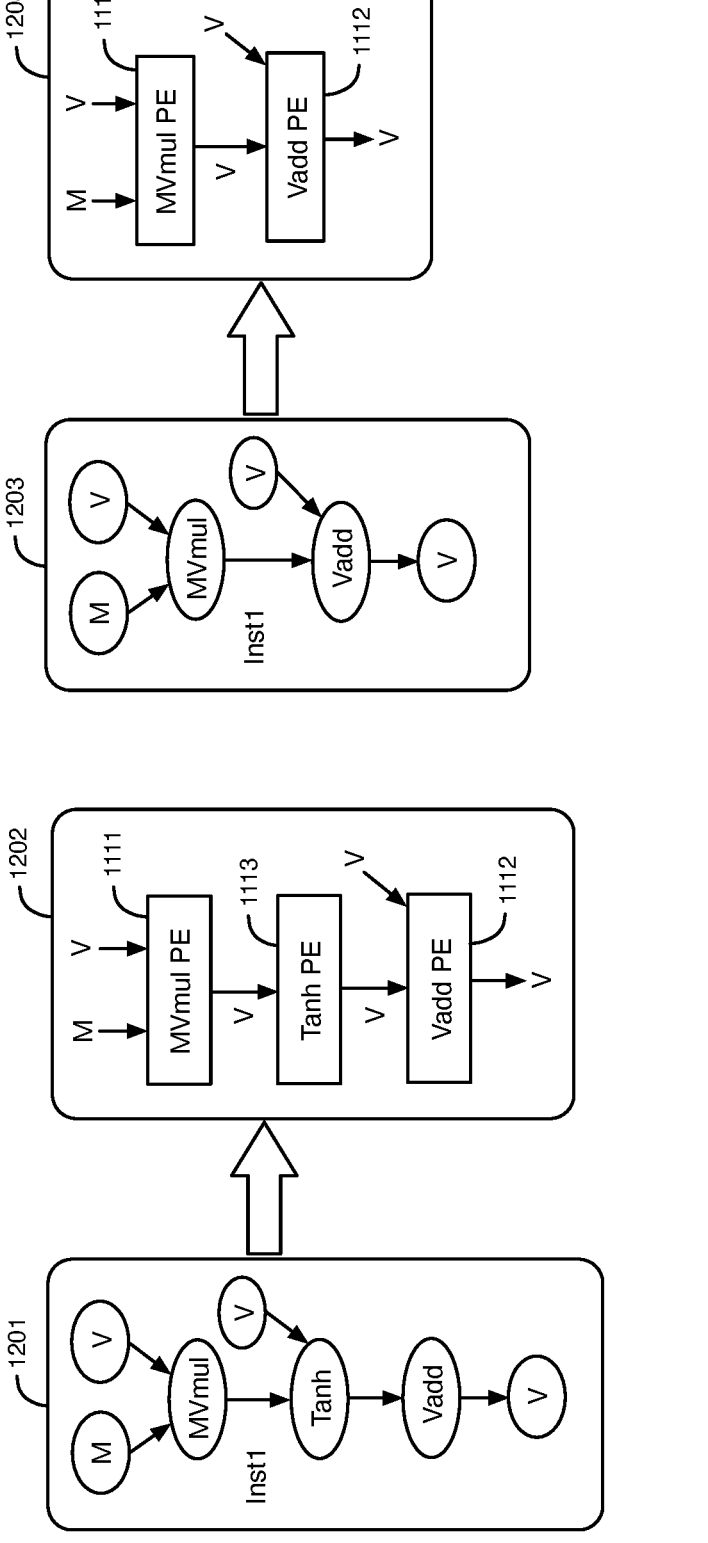
FIG. 12 is a diagram that illustrates an example of an implementation of the processor optimizer and the software and hardware co-designer in the processor generator system of FIGS. 5-9.

FIG. 12 is a diagram that illustrates an example of an implementation of the processor optimizer 503 and the software and hardware co-designer 504 in processor generator system 500 of FIGS. 5-9. In the example of FIG. 12, the model optimizer 903 in software and hardware co-designer 504 optimizes the software application program my_app1 from the example disclosed herein with respect to FIG. 11 to generate a more optimal software application program my_app2, which is defined (def) below. Program my_app2 includes the same operations as my_app1. In the program my_app2, the order of the operations Tanh and Vadd have been switched.

```
def my_app2(M1, V1, V2):
    V3=MVmul(M1, V1);
    V4=Tanh(V3);
    V5=Vadd(V2, V3);
    Return V5
```

FIG. 12 illustrates an example of an instruction set 1201 for the program my_app2 shown above that includes a single instruction Inst1 for the operations MVmul, Vadd, and Tanh. In instruction set 1201, the order of the operations Tanh and Vadd have been switched relative to instruction set 1104. Processor optimizer 503 optimizes the hardware block 1108 generated by processor generator 502 in the example of FIG. 11 using architecture optimization block 707 to generate a more optimal hardware block 1202 by switching the order of the processing elements 1112-1113 to match the order of the operations Tanh and Vadd in instruction set 1201, as shown in FIG. 12.

The model optimizer 903 in software and hardware co-designer 504 then optimizes the software application program my_app2 to generate a more optimal software application program my_app3, which is defined (def) below. Program my_app3 includes the same operations as my_app2. In the program my_app3, operation Tanh has been removed.

```
def my_app3(M1, V1, V2):
    V3=MVmul(M1, V1);
    // Tanh removed
    V4=Vadd(V2, V3);
    Return V4
```

FIG. 12 illustrates an example of an instruction set 1203 for the program my_app3 shown above that includes a single instruction Inst1 for the operations MVmul and Vadd. In instruction set 1203, operation Tanh has been removed compared to instruction set 1201. Processor optimizer 503 optimizes the hardware block 1202 using architecture optimization block 707 to generate a more optimal hardware block 1204 by removing the processing element (PE) 1113 for Tanh to match the operations in instruction set 1203. Hardware block 1204 only includes processing elements 1111-1112 for processing operations MVmul and Vadd. Hardware block 1204 may be used in the processor architecture for the processor circuit generated by system 500.

Verification can be performed by analyzing the graphs of FIGS. 11-12 and generating test vectors that are usable to verify the processor circuit instances generated by system 500. Verification can be performed at various levels. For example, instruction set architecture (ISA) graphs can be used to produce (higher) top-level tests of the entire processor circuit hardware. The hardware module graphs (e.g., graphs 1102-1104) can be used to produce verification test vectors for lower-level individual hardware modules. Formal verification can also be performed, because each graph provides a symbolic representation of functionality. Formal verification assertions and/or hooks can be inserted in the processor circuit instance so that monitored values can be fed to formal verifier tools and hierarchically applied from low-level individual hardware modules to the top-level processor circuit design and any mix of levels in partitioning the formal verification problem (e.g., partitioning a formal verification of a CISC processor into a group of several simpler PEs in a first partition, a complex PE in a second partition, and a final formal verification of both partitions). Such flexible partitioning and hierarchy is critical to allow breaking down the formal verification problem into smaller more manageable partitions to avoid the state explosion problem in formal verification.

In some implementations, instruction set architectures (ISAs), hardware blocks, and graph structures can be stored in library 607 and re-used to generate new processor circuits (e.g., CG-CISC processors) and application programs. As examples, model optimizer 903 may reuse commonly occurring hardware blocks stored in library 607 to optimize the programs my_app1, my_app2, and my_app3. Also, incremental changes may be made to the processor circuit instance by changing the instructions in the instruction set architecture and the hardware composition.

Figure 13:
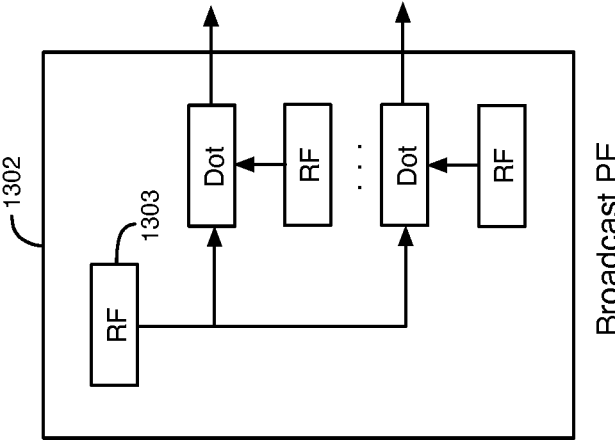
FIG. 13 is a diagram that illustrates examples of architectures for two types of processing elements that can be used to perform arithmetic operations for matrices.
Figure 13:
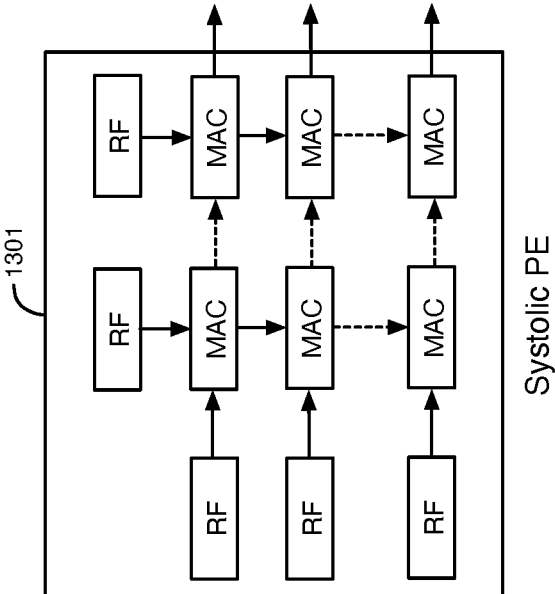

The processing elements disclosed herein can comprise a variety of different designs, architectural states, compute blocks, and/or interconnects. FIG. 13 is a diagram that illustrates examples of architectures for two types of processing elements that can be used to perform arithmetic operations for matrices. The processing elements shown in FIG. 13 can be used in any of the processor circuits disclosed herein, for example, with respect to FIGS. 1A-4. In addition, the processing elements shown in FIG. 13 can be provided in a processor circuit generated using any of the processor circuit generation techniques disclosed herein, for example, with respect to FIGS. 5-12.

FIG. 13 shows an example of a systolic processor element PE 1301 that multiplies two matrices. PE 1301 includes register files (RFs) and multiply accumulate (MAC) units. The register files (RFs) in the horizontal row store numbers from a first matrix, and the RFs in the vertical column store numbers from a second matrix. Each RF may, for example, store a row or column of a matrix. The numbers stored in the RFs are provided to multiply accumulate (MAC) units. The multiply accumulate (MAC) units multiply the 2 matrices received from the register files. The output of each MAC unit is provided to another MAC unit or to an output of the PE 1301. The solid arrows in PE 1301 indicate connections between a RF and a MAC unit, a MAC unit and a MAC unit, or between a MAC unit and an output of the PE 1301. PE 1301 may include two or more horizontal rows of RFs and MAC units and two or more vertical columns of RFs and MAC units, as shown in FIG. 13. The dotted arrows in PE 1301 indicate connections between a MAC unit and another MAC unit in a row or column not shown in FIG. 13.

FIG. 13 shows an example of a broadcast processor element PE 1302 that multiplies vectors. The vectors may be, for example, from one or two matrices. PE 1302 includes register files (RFs) and dot product circuits. Each register file (RF) stores a vector from a matrix. PE 1302 may include any number of dot product circuits arranged in a vertical column. The vector stored in register file (RF) 1303 is provided to an input of each of the dot product circuits in PE 1302. Each of the dot product circuits in PE 1302 performs a dot production operation on the vectors received from register file 1303 and another register file (RF). The results of the dot product operations are provided to the outputs of the broadcast PE 1302.

Figure 14:
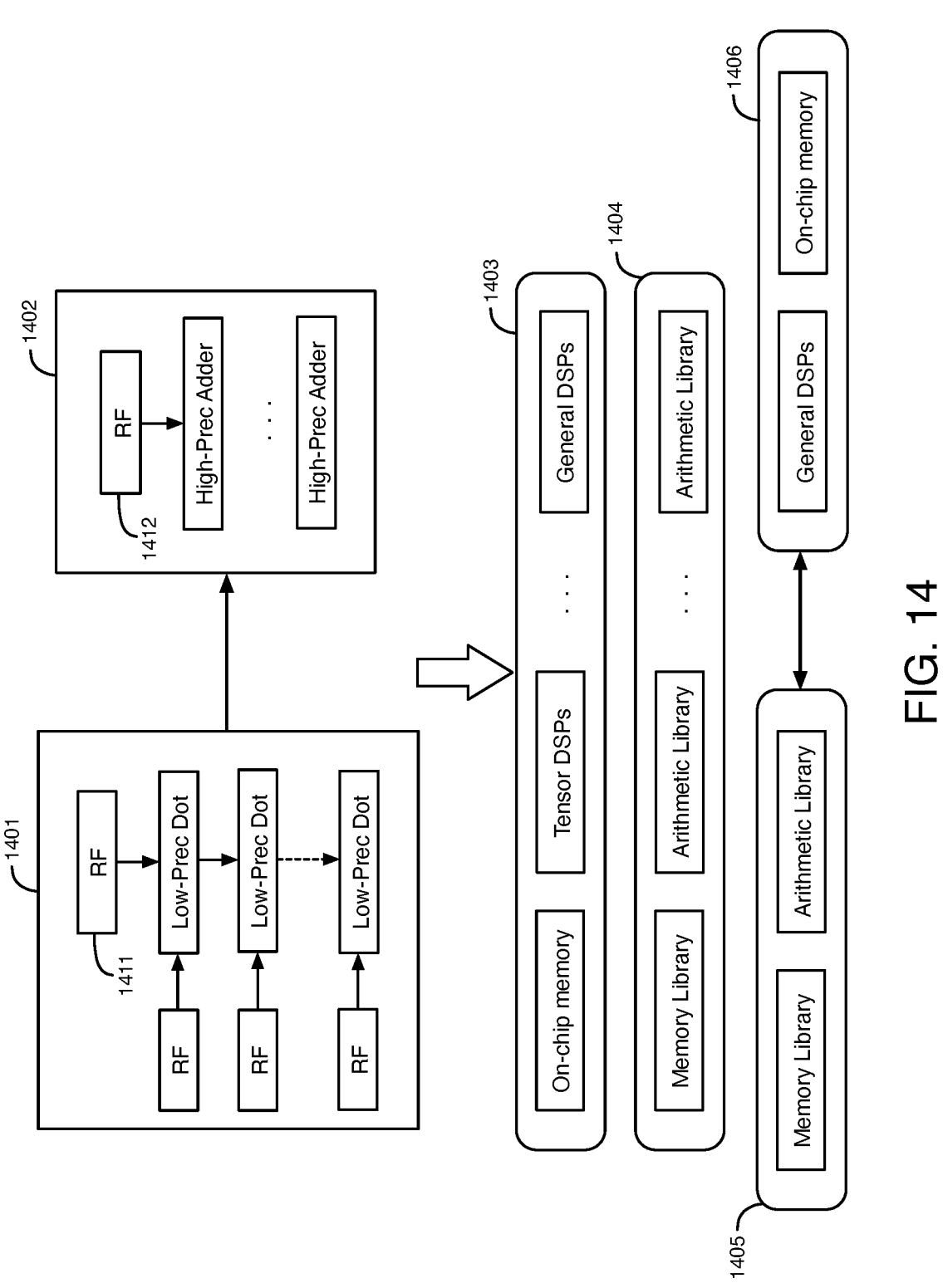
FIG. 14 is a diagram that illustrates examples of architectures for two types of processing elements that can be used in various types of integrated circuits (ICs).

FIG. 14 is a diagram that illustrates examples of architectures for two types of processing elements that can be used in various types of integrated circuits (ICs). FIG. 14 illustrates processing elements (PEs) 1401 and 1402. The PEs 1401-402 shown in FIG. 14 can be used in any of the processor circuits disclosed herein, for example, with respect to FIGS. 1A-4. In addition, the PEs 1401-402 shown in FIG. 14 can be provided in a processor circuit generated using any of the processor circuit generation techniques disclosed herein, for example, with respect to FIGS. 5-12.

Processing element (PE) 1401 multiplies one or more matrices and/or vectors using register files (RFs) and low-precision (low-prec.) dot product circuits. Each of the RFs in PE 1401 stores a vector (e.g., from a matrix). PE 1401 may include any number of low-precision dot product circuits arranged in a vertical column. The vector stored in register file (RF) 1411 is provided to an input of each of the low-precision dot product circuits in PE 1401. Each of the low-precision dot product circuits in PE 1401 performs a low-precision dot production operation on the vectors received from register file 1411 and another register file (RF).

PE 1402 adds vectors using high-precision adder circuits and one or more register files, such as (RF) 1412. The vector stored in RF 1412 is provided to an input of the first high-precision adder circuit in PE 1402. Each of the high-precision adder circuits in PE 1402 adds input vectors received from one or more register files to generate a vector sum.

FIG. 14 also shows examples of 4 different integrated circuits (ICs) 1403-1406 containing computation circuits that can implement any one or more of the PEs 1401-1402 and/or the PEs 1301-1302 of FIG. 13. IC 1403 may be, for example, a programmable logic integrated circuit (IC), such as an FPGA, that includes on-chip memory and different types of arithmetic units (e.g., digital signal processors), such as multiple tensor digital signal processing (DSP) circuits and multiple general purpose DSP circuits. IC 1404 may be, for example, an application specific IC (ASIC) that includes one or more memory libraries and multiple arithmetic libraries. IC 1405 may be, for example, a chiplet IC that includes a memory library and an arithmetic library. IC 1406 may be, for example, a programmable logic IC that includes general purpose DSPs and on-chip memory. Also, IC 1405 and IC 1406 may be packaged, integrated, and connected via 2.5 dimensional (2.5D) or three-dimensional (3D) interconnects. The general purpose DSPs, tensor DSPs, and arithmetic libraries in ICs 1403-1406 may implement and perform the functions of any one or more of PEs 1401-1402, PEs 1301-1302, and/or any of the PEs disclosed herein. The on-chip memory and the memory libraries in ICs 1403-1406 may store matrices, vectors, and numbers used for the operations performed by the processing elements implemented by the general purpose DSPs, tensor DSPs, and arithmetic libraries in ICs 1403-1406.

Additional examples are now described. Example 1 is a processor circuit comprising: a first front-end circuit for scheduling first instructions for a first application program; a second front-end circuit for scheduling second instructions for a second application program; a back-end processing circuit that processes first operations in the first instructions in the first application program and second operations in the second instructions in the second application program; and a multi-program scheduler circuit that causes the first front-end circuit to schedule processing of the first operations on the back-end processing circuit, wherein the multi-program scheduler circuit causes the second front-end circuit to schedule processing of the second operations on the back-end processing circuit.

In Example 2, the processor circuit of Example 1 may optionally include, wherein the back-end processing circuit comprises: a first processing circuit that processes the first operations; and a second processing circuit that processes the second operations, wherein the multi-program scheduler circuit causes the first processing circuit to process one of the first operations concurrently with the second processing circuit processing one of the second operations.

In Example 3, the processor circuit of Example 1 may optionally include, wherein the back-end processing circuit comprises: first and second processing circuits, wherein the multi-program scheduler circuit causes the first processing circuit to process a first one of the first operations in a first one of the first instructions concurrently with the second processing circuit processing a second one of the first operations in a second one of the first instructions.

In Example 4, the processor circuit of any one of Examples 1-3 may further comprise: a third front-end circuit for scheduling third instructions for a third application program that is different than the first and the second application programs, wherein the back-end processing circuit processes third operations in the third instructions in the third application program, and wherein the multi-program scheduler circuit causes the third front-end circuit to schedule processing of the third operations on the back-end processing circuit.

In Example 5, the processor circuit of Example 4 may optionally include, wherein the back-end processing circuit comprises: a first processing circuit that processes the first operations; a second processing circuit that processes the second operations; and a third processing circuit that processes the third operations, wherein the multi-program scheduler circuit causes the first, the second, and the third processing circuits to process one of the first operations, one of the second operations, and one of the third operations concurrently.

In Example 6, the processor circuit of any one of Examples 1-5 may optionally include, wherein the back-end processing circuit comprises first and second processing circuits and a hazard detection circuit that detects and resolves a data dependency between data generated by a first one of the first operations processed by the first processing circuit and the data input to a second one of the first operations processed by the second processing circuit by tagging the first and the second ones of the first operations.

In Example 7, the processor circuit of any one of Examples 1-6 may further comprise: a first register file that stores a first architectural state for a first private vector shared by a first subset of the first operations in a first thread in the first application program; a second register file that stores a second architectural state for a second private vector shared by a second subset of the first operations in a second thread in the first application program; and a front-end scheduler circuit that manages sharing between the first and the second architectural states to prevent collisions between data accesses to the first and the second register files.

In Example 8, the processor circuit of any one of Examples 1-7 may further comprise: a register file that stores architectural states for a matrix shared by first and second threads in the first application program; and a front-end scheduler circuit that provides each of the first and the second threads access to the architectural states for the matrix and that manages sharing between the architectural states of the matrix to prevent collisions between data accesses to the register file.

In Example 9, the processor circuit of any one of Examples 1-8 may further comprise: a register file that stores architectural states for a matrix shared by the first and the second application programs; and a front-end scheduler circuit that provides each of the first and the second application programs access to the architectural states for the matrix and that manages sharing between the architectural states of the matrix to prevent collisions between data accesses to the register file.

In Example 10, the processor circuit of any one of Examples 1-9 may further comprise: a thread scheduler and state controller circuit that causes the first front-end circuit to schedule processing of first threads in the first application program and the second front-end circuit to schedule processing of second threads in the second application program, wherein the back-end processing circuit comprises first and second processing circuits, wherein the thread scheduler and state controller circuit causes the first processing circuit to process one of the first operations in one of the first threads concurrently with the second processing circuit processing one of the second operations in one of the second threads.

In Example 11, the processor circuit of any one of Examples 1-10 may optionally include, wherein the back-end processing circuit comprises: first and second processing circuits, wherein each of the first and the second processing circuits comprises interconnect circuits and compute circuits that are shared between the first and the second application programs.

In Example 12, the processor circuit of any one of Examples 1-11 may optionally include, wherein the processor circuit comprises a coarse-grained complex instruction set computing processor architecture, and wherein the back-end processing circuit comprises a hazard detection circuit that identifies coarse-grained instructions among the first and the second instructions that have no data dependencies, and wherein the processor circuit schedules and executes the coarse-grained instructions having no data dependencies out-of-order.

Example 13 is a processor circuit comprising: a first front-end circuit for scheduling first and second threads for a first application program; first processing circuit that processes first operations in the first thread; a second processing circuit that processes second operations in the second thread; and a thread scheduler circuit that causes the first front-end circuit to schedule processing of the first operations on the first processing circuit, wherein the thread scheduler circuit causes the first front-end circuit to schedule processing of the second operations on the second processing circuit, and wherein the thread scheduler circuit causes the first processing circuit to process one of the first operations concurrently with the second processing circuit processing one of the second operations.

In Example 14, the processor circuit of Example 13 may optionally include, wherein the thread scheduler circuit comprises: a thread identification circuit that stores a first thread identifier for identifying the first operations in the first thread and a second identifier for identifying the second operations in the second thread, wherein the first front-end circuit uses the first and the second thread identifiers to keep track of which of the first and the second threads are being processed by the first and the second processing circuits.

In Example 15, the processor circuit of any one of Examples 13-14 may further comprise: a second front-end circuit for scheduling third and fourth threads for a second application program, wherein the thread scheduler circuit causes the second front-end circuit to schedule processing of third operations for the third thread on the first processing circuit and to schedule processing of fourth operations for the fourth thread on the second processing circuit, and wherein the thread scheduler circuit causes the first processing circuit to process one of the third operations concurrently with the second processing circuit processing one of the fourth operations.

In Example 16, the processor circuit of Example 15 may further comprise: a multi-program scheduler circuit that causes the first processing circuit to process an additional one of the first operations concurrently with the second processing circuit processing an additional one of the fourth operations.

In Example 17, the processor circuit of any one of Examples 13-16 may optionally include, wherein each of the first and the second processing circuits comprises a hazard detection circuit that detects and resolves a data dependency between data input to the one of the second operations processed by the second processing circuit and the data generated by the one of the first operations processed by the first processing circuit.

In Example 18, the processor circuit of any one of Examples 13-17 may further comprise: a first register file that stores a first architectural state for a first private vector shared by the first operations in the first thread; a second register file that stores a second architectural state for a second private vector shared by the second operations in the second thread; and a front-end scheduler circuit that manages sharing between the first and the second architectural states to prevent collisions between data accesses to the first and the second register files.

In Example 19, the processor circuit of any one of Examples 13-18 may further comprise: a register file that stores architectural states for a matrix shared by the first and the second threads; and a front-end scheduler circuit that provides each of the first and the second threads access to the architectural states for the matrix and that manages sharing between the architectural states of the matrix to prevent collisions between data accesses to the register file.

In Example 20, the processor circuit of any one of Examples 13-19 may optionally include, wherein the processor circuit comprises a coarse-grained complex instruction set computing processor architecture.

Example 21 is a processor generator system configured to generate a processor circuit, wherein the processor generator system comprises: a processor designer that creates specifications for the processor circuit using workloads for an application program; a processor generator that generates a first instance of the processor circuit that comprises a first processor architecture using the specifications; a processor optimizer that generates a second instance of the processor circuit that comprises a second processor architecture based on the first instance of the processor circuit using the workloads; and a software and hardware co-designer that modifies the application program to generate a modified application program using the second instance of the processor circuit.

In Example 22, the processor generator system of Example 21 may optionally include, wherein the processor optimizer comprises a performance estimator and profiler block that generates compute graphs from the workloads, obtains the first instance of the processor circuit and simulation traces from a performance simulator, and identifies bottlenecks in the compute graphs and the simulation traces.

In Example 23, the processor generator system of Example 22 may optionally include, wherein the processor optimizer further comprises an architecture optimization block that optimizes the first instance of the processor circuit to generate the second instance of the processor circuit by at least one of removing, adding, extending, or changing hardware blocks in the first processor architecture to reduce the bottlenecks using a hardware space.

In Example 24, the processor generator system of any one of Examples 21-23 may optionally include, wherein the processor generator comprises a computer-aided processor generation block that uses the specifications and hardware modules accessed from a library to design the first instance of the processor circuit.

In Example 25, the processor generator system of any one of Examples 21-24 may optionally include, wherein the processor generator causes the first processor architecture to comprise a coarse-grained complex instruction set computing architecture.

In Example 26, the processor generator system of any one of Examples 21-25 may optionally include, wherein the processor optimizer modifies the specifications based on the second instance of the processor circuit to generate modified specifications, and wherein the processor generator generates a third instance of the processor circuit that comprises a third processor architecture using the modified specifications.

In Example 27, the processor generator system of any one of Examples 21-26 may optionally include, wherein the software and hardware co-designer generates modified workloads for the modified application program, wherein the processor designer generates modified specifications for the processor circuit using the modified workloads for the modified application program, and wherein the processor generator generates a third instance of the processor circuit that comprises a third processor architecture using the modified specifications.

In Example 28, the processor generator system of any one of Examples 21-27 may optionally include, wherein the processor generator selects the first processor architecture for the first instance of the processor circuit based on the first processor architecture comprising functional blocks that implement an instruction set indicated by the specifications and that have composable interfaces.

In Example 29, the processor generator system of any one of Examples 21-28 may optionally include, wherein the processor generator comprises a register transfer level generator block that generates a register transfer level file for the first processor architecture, and wherein the register transfer level generator block outputs the register transfer level file for the first processor architecture as at least part of the first instance of the processor circuit.

In Example 30, the processor generator system of any one of Examples 21-29 may optionally include, wherein the software and hardware co-designer comprises an evaluator that runs the modified application program on the second instance of the processor circuit using a simulator to determine if the modified application program satisfies optimization goals based on statistics generated during processing of the modified application program on the second instance of the processor circuit.

In Example 31, the processor generator system of Example 30 may optionally include, wherein the software and hardware co-designer further comprises a model optimizer that changes an algorithm in the application program using the statistics received from the evaluator to cause the modified application program to more effectively meet the optimization goals.

Example 32 is a method for generating a processor circuit using a processor design system, wherein the method comprises: creating, with a processor designer, specifications for the processor circuit using workloads for an application program; generating, with a processor generator, a first instance of the processor circuit that comprises a first processor architecture using the specifications; generating, with a processor optimizer, a second instance of the processor circuit that comprises a second processor architecture based on the first instance of the processor circuit using the workloads; and modifying, with a software and hardware co-designer, the application program to generate a modified application program using the second instance of the processor circuit.

In Example 33, the method of Example 32 may further comprise: generating, with the software and hardware co-designer, modified workloads for the modified application program; generating, with the processor designer, modified specifications for the processor circuit using the modified workloads for the modified application program; and generating, with the processor generator, a third instance of the processor circuit that comprises a third processor architecture using the modified specifications.

In Example 34, the method of any one of Examples 32-33 may optionally include, wherein generating the first instance of the processor circuit that comprises the first processor architecture further comprises: selecting, with the processor generator, the first processor architecture for the first instance of the processor circuit based on the first processor architecture comprising processor architectural states indicated by the specifications and functional blocks that implement an instruction set indicated by the specifications and that have composable interfaces.

In Example 35, the method of any one of Examples 32-34 may optionally include, wherein generating the second instance of the processor circuit that comprises the second processor architecture further comprises: generating, with a performance estimator and profiler, compute graphs from the workloads; obtaining, with the performance estimator and profiler, the first instance of the processor circuit and simulation traces from a performance simulator; and identifying, with the performance estimator and profiler, bottlenecks in the compute graphs and the simulation traces.

In Example 36, the method of Example 35 may further comprise: optimizing, with an architecture optimization block, the first instance of the processor circuit to generate the second instance of the processor circuit by at least one of removing, adding, extending, or changing hardware blocks in the first processor architecture to reduce the bottlenecks using a hardware space for the processor circuit.

In Example 37, the method of any one of Examples 32-36 may further comprise: modifying, with the processor optimizer, the specifications based on the second instance of the processor circuit to generate modified specifications; and generating, with the processor generator, a third instance of the processor circuit that comprises a third processor architecture using the modified specifications.

In Example 38, the method of any one of Examples 32-37 may optionally include, wherein modifying the application program to generate the modified application program further comprises: running, with an evaluator, the modified application program on the second instance of the processor circuit to determine if the modified application program satisfies optimization goals based on statistics generated during processing of the modified application program on the second instance of the processor circuit.

In Example 39, the method of Example 38 may optionally include, wherein modifying the application program to generate the modified application program further comprises: modifying, with a model optimizer, an algorithm in the application program using the statistics received from the evaluator to cause the modified application program to more effectively meet the optimization goals.

In Example 40, the method of any one of Examples 32-39 may further comprise: generating, with a register transfer level generator block in the processor generator, a register transfer level file for the first processor architecture.

In Example 41, the method of any one of Examples 32-40 may further comprise: using, with a computer-aided processor generation block in the processor generator, the specifications and hardware modules accessed from a library to design the first instance of the processor circuit.

In Example 42, the method of any one of Examples 32-41 may optionally include, wherein generating the first instance of the processor circuit with the processor generator comprises causing the first processor architecture to comprise a coarse-grained complex instruction set computing architecture.

In Example 43, the method of any one of Examples 32-42 may optionally include, wherein the processor design system generates a complex instruction set computing processor circuit for a programmable logic integrated circuit with heterogenous arithmetic units.

In Example 44, the method of any one of Examples 32-43 may optionally include, wherein the processor design system generates a complex instruction set computing processor circuit for an integrated circuit package comprising two and a half or three dimensional integrated combinations of programmable logic or application specific integrated circuits.

In Example 45, the method of any one of Examples 32-44 may optionally include, wherein a non-transitory computer-readable storage medium comprises instructions stored thereon for causing a computer system to execute the method for generating the processor circuit using the processor design system.

In Example 46, the method of any one of Examples 32-45 may optionally include, wherein generating, with the processor optimizer, the second instance of the processor circuit comprises causing the second processor architecture to comprise a coarse-grained complex instruction set computing architecture.

Example 47 is a method for processing first and second application programs using a processor circuit, the method comprising: scheduling first instructions for the first application program using a first front-end circuit; scheduling second instructions for the second application program using a second front-end circuit; causing the first front-end circuit to schedule processing of first operations in the first instructions on a back-end processing circuit using a multi-program scheduler circuit; causing the second front-end circuit to schedule processing of second operations in the second instructions on the back-end processing circuit using the multi-program scheduler circuit; and processing the first operations and the second operations using the back-end processing circuit.

In Example 48, the method of Example 47 may optionally include, wherein processing the first and the second operations comprises: processing the first operations using a first processing circuit and processing the second operations using a second processing circuit, and wherein causing the first front-end circuit to schedule processing of the first operations comprises causing the first processing circuit to process one of the first operations concurrently with the second processing circuit processing one of the second operations using the multi-program scheduler circuit.

In Example 49, the method of Example 47 may optionally include, wherein causing the first front-end circuit to schedule processing of the first operations comprises causing a first processing circuit to process a first one of the first operations in a first one of the first instructions concurrently with a second processing circuit processing a second one of the first operations in a second one of the first instructions using the multi-program scheduler circuit.

In Example 50, the method of any one of Examples 47-49 may further comprise: scheduling third instructions for a third application program that is different than the first and the second application programs using a third front-end circuit; causing the third front-end circuit to schedule processing of third operations in the third instructions in the third application program on the back-end processing circuit using the multi-program scheduler circuit; and processing the third operations using the back-end processing circuit.

In Example 51, the method of Example 50 may optionally include, wherein processing the first, the second, and the third operations comprises: processing the first operations using a first processing circuit, processing the second operations using a second processing circuit, and processing the third operations using a third processing circuit, and wherein causing the first, the second, and the third front-end circuits to schedule processing of the first, the second, and the third operations comprises causing the first, the second, and the third processing circuits to process one of the first operations, one of the second operations, and one of the third operations concurrently using the multi-program scheduler circuit.

In Example 52, the method of any one of Examples 47-51 may optionally comprise: detecting and resolving a data dependency between data generated by a first one of the first operations processed by a first processing circuit and the data input to a second one of the first operations processed by a second processing circuit using a hazard detection circuit by tagging the first and the second ones of the first operations.

In Example 53, the method of any one of Examples 47-52 may further comprise: storing, in a first register file, a first architectural state for a first private vector shared by a first subset of the first operations in a first thread in the first application program; storing, in a second register file, a second architectural state for a second private vector shared by a second subset of the first operations in a second thread in the first application program; and managing sharing between the first and the second architectural states to prevent collisions between data accesses to the first and the second register files using a front-end scheduler circuit.

In Example 54, the method of any one of Examples 47-53 may further comprise: storing, in a register file, architectural states for a matrix shared by first and second threads in the first application program; providing each of the first and the second threads access to the architectural states for the matrix using a front-end scheduler circuit; and managing sharing between the architectural states for the matrix to prevent collisions between data accesses to the register file using the front-end scheduler circuit.

In Example 55, the method of any one of Examples 47-54 may further comprise: storing, in a register file, architectural states for a matrix shared by the first and the second application programs; providing each of the first and the second application programs access to the architectural states for the matrix using a front-end scheduler circuit; and managing sharing between the architectural states for the matrix to prevent collisions between data accesses to the register file using the front-end scheduler circuit.

In Example 56, the method of any one of Examples 47-55 may further comprise: causing the first front-end circuit to schedule processing of first threads in the first application program using a thread scheduler and state controller circuit; causing the second front-end circuit to schedule processing of second threads in the second application program using the thread scheduler and state controller circuit, wherein the back-end processing circuit comprises first and second processing circuits; and causing the first processing circuit to process one of the first operations in one of the first threads concurrently with the second processing circuit processing one of the second operations in one of the second threads using the thread scheduler and state controller circuit.

In Example 57, the method of any one of Examples 47-56 may optionally include, wherein the back-end processing circuit comprises: first and second processing circuits, and wherein each of the first and the second processing circuits comprises interconnect circuits and compute circuits that are shared between the first and the second application programs.

In Example 58, the method of any one of Examples 47-57 may optionally further comprise: identifying coarse-grained instructions among the first and the second instructions that have no data dependencies using a hazard detection circuit in the back-end processing circuit; and scheduling and executing the coarse-grained instructions having no data dependencies out-of-order using the processor circuit, wherein the processor circuit comprises a coarse-grained complex instruction set computing processor architecture.

In Example 59, the method of any one of Examples 47-58 may optionally include, wherein a non-transitory computer-readable storage medium comprises instructions stored thereon for causing a computer system to execute the method for processing the first and the second application programs using the processor circuit.

Example 60 is a method for processing first and second threads in a first application program using a processor circuit, the method comprising: scheduling the first and the second threads for the first application program using a first front-end circuit; causing the first front-end circuit to schedule processing of first operations in the first thread on a first processing circuit using a thread scheduler circuit; causing the first front-end circuit to schedule processing of second operations in the second thread on a second processing circuit using the thread scheduler circuit; processing the first operations using the first processing circuit; processing the second operations using the second processing circuit; and causing the first processing circuit to process one of the first operations concurrently with the second processing circuit processing one of the second operations using the thread scheduler circuit.

In Example 61, the method of Example 60 may optionally further comprise: storing a first thread identifier for identifying the first operations in the first thread and a second thread identifier for identifying the second operations in the second thread in a thread identification circuit; and using the first and the second thread identifiers to keep track of which of the first and the second threads are being processed by the first and the second processing circuits using the first front-end circuit.

In Example 62, the method of any one of Examples 60-61 may optionally further comprise: scheduling third and fourth threads for a second application program using a second front-end circuit; causing, with the thread scheduler circuit, the second front-end circuit to schedule processing of third operations for the third thread on the first processing circuit and to schedule processing of fourth operations for the fourth thread on the second processing circuit; and causing the first processing circuit to process one of the third operations concurrently with the second processing circuit processing one of the fourth operations using the thread scheduler circuit.

In Example 63, the method of Example 62 may optionally further comprise: causing the first processing circuit to process an additional one of the first operations concurrently with the second processing circuit processing an additional one of the fourth operations using a multi-program scheduler circuit.

In Example 64, the method of any one of Examples 60-63 may optionally further comprise: detecting and resolving a data dependency between data input to an additional one of the second operations processed by the second processing circuit and the data generated by an additional one of the first operations processed by the first processing circuit using hazard detection circuits in the first and the second processing circuits.

In Example 65, the method of any one of Examples 60-64 may optionally further comprise: storing, in a first register file, a first architectural state for a first private vector shared by the first operations in the first thread; storing, in a second register file, a second architectural state for a second private vector shared by the second operations in the second thread; and managing sharing between the first and the second architectural states to prevent collisions between data accesses to the first and the second register files using a front-end scheduler circuit.

In Example 66, the method of any one of Examples 60-65 may optionally further comprise: storing, in a register file, architectural states for a matrix shared by the first and the second threads; and providing each of the first and the second threads access to the architectural states for the matrix using a front-end scheduler circuit; and managing sharing between the architectural states for the matrix to prevent collisions between data accesses to the register file using the front-end scheduler circuit.

In Example 67, the method of any one of Examples 60-66 may optionally include, wherein the processor circuit comprises a coarse-grained complex instruction set computing processor architecture.

In Example 68, the method of any one of Examples 60-67 may optionally further comprise: identifying coarse-grained instructions in the first and the second threads that have no data dependencies using a hazard detection circuit; and scheduling and executing the coarse-grained instructions having no data dependencies out-of-order using the processor circuit.

In Example 69, the method of any one of Examples 60-68 may optionally include, wherein a non-transitory computer-readable storage medium comprises instructions stored thereon for causing a computer system to execute the method for processing the first and the second threads in the first application program using the processor circuit.

The foregoing description of the examples has been presented for the purpose of illustration. The foregoing description is not intended to be exhaustive or to be limiting to the examples disclosed herein. In some instances, various features can be employed without a corresponding use of other features as set forth. Many modifications, substitutions, and variations are possible in light of the above teachings.

What is claimed is:

1. A processor circuit comprising:
a first front-end circuit for scheduling first instructions for a first application program;
a second front-end circuit for scheduling second instructions for a second application program;
a back-end processing circuit that processes first operations in the first instructions in the first application program and second operations in the second instructions in the second application program;
a multi-program scheduler circuit that causes the first front-end circuit to schedule processing of the first operations on the back-end processing circuit, wherein the multi-program scheduler circuit causes the second front-end circuit to schedule processing of the second operations on the back-end processing circuit;
a first register file that stores first architectural states for a first matrix shared by the first and the second application programs; and
a front-end scheduler circuit that provides each of the first and the second application programs access to the first architectural states for the first matrix and that manages sharing between the first architectural states for the first matrix to prevent collisions between data accesses to the first register file.

2. The processor circuit of claim 1, wherein the back-end processing circuit comprises:
a first processing circuit that processes the first operations; and
a second processing circuit that processes the second operations, wherein the multi-program scheduler circuit causes the first processing circuit to process one of the first operations concurrently with the second processing circuit processing one of the second operations.

3. The processor circuit of claim 1 further comprising:
a third front-end circuit for scheduling third instructions for a third application program that is different than the first and the second application programs,
wherein the back-end processing circuit processes third operations in the third instructions in the third application program, and wherein the multi-program scheduler circuit causes the third front-end circuit to schedule processing of the third operations on the back-end processing circuit,
wherein the back-end processing circuit comprises a first processing circuit that processes the first operations, a second processing circuit that processes the second operations, and a third processing circuit that processes the third operations, and wherein the multi-program scheduler circuit causes the first, the second, and the third processing circuits to process one of the first operations, one of the second operations, and one of the third operations concurrently.

4. The processor circuit of claim 1, wherein the back-end processing circuit comprises first and second processing circuits and a hazard detection circuit that detects and resolves a data dependency between data generated by a first one of the first operations processed by the first processing circuit and the data input to a second one of the first operations processed by the second processing circuit by tagging the first and the second ones of the first operations.

5. The processor circuit of claim 1 further comprising:
a second register file that stores a second architectural state for a first private vector shared by a first subset of the first operations in a first thread in the first application program; and
a third register file that stores a third architectural state for a second private vector shared by a second subset of the first operations in a second thread in the first application program,
wherein the front-end scheduler circuit manages sharing between the second and the third architectural states to prevent collisions between data accesses to the second and the third register files.

6. The processor circuit of claim 1 further comprising:
a second register file that stores second architectural states for a second matrix shared by first and second threads in the first application program,
wherein the front-end scheduler circuit provides each of the first and the second threads access to the second architectural states for the second matrix and that manages sharing between the second architectural states for the second matrix to prevent collisions between data accesses to the second register file.

7. The processor circuit of claim 1,
wherein the processor circuit comprises a coarse-grained complex instruction set computing processor architecture.

8. The processor circuit of claim 1, wherein the processor circuit comprises a coarse-grained complex instruction set computing processor architecture, wherein the back-end processing circuit comprises a hazard detection circuit that identifies coarse-grained instructions among the first and the second instructions that have no data dependencies, and wherein the processor circuit schedules and executes the coarse-grained instructions having no data dependencies out-of-order.

9. A processor circuit comprising:
a first front-end circuit for scheduling first and second threads for a first application program;
a first processing circuit that processes first operations in the first thread;
a second processing circuit that processes second operations in the second thread;
a thread scheduler circuit that causes the first front-end circuit to schedule processing of the first operations on the first processing circuit, wherein the thread scheduler circuit causes the first front-end circuit to schedule processing of the second operations on the second processing circuit, and wherein the thread scheduler circuit causes the first processing circuit to process one of the first operations concurrently with the second processing circuit processing one of the second operations; and a first register file that stores first architectural states for a matrix shared by the first and the second threads.

10. The processor circuit of claim 9, wherein the thread scheduler circuit comprises:

a thread identification circuit that stores a first thread identifier for identifying the first operations in the first thread and a second thread identifier for identifying the second operations in the second thread, wherein the first front-end circuit uses the first and the second thread identifiers to keep track of which of the first and the second threads are being processed by the first and the second processing circuits.

11. The processor circuit of claim 9 further comprising:

a second front-end circuit for scheduling third and fourth threads for a second application program, wherein the thread scheduler circuit causes the second front-end circuit to schedule processing of third operations for the third thread on the first processing circuit and to schedule processing of fourth operations for the fourth thread on the second processing circuit, and wherein the thread scheduler circuit causes the first processing circuit to process one of the third operations concurrently with the second processing circuit processing one of the fourth operations.

12. The processor circuit of claim 11 further comprising:

a multi-program scheduler circuit that causes the first processing circuit to process an additional one of the first operations concurrently with the second processing circuit processing an additional one of the fourth operations, and wherein the processor circuit comprises a coarse-grained complex instruction set computing processor architecture.

13. The processor circuit of claim 9 further comprising:

a hazard detection circuit that detects and resolves a data dependency between data input to an additional one of the second operations processed by the second processing circuit and the data generated by an additional one of the first operations processed by the first processing circuit.

14. The processor circuit of claim 9 further comprising:

a second register file that stores a second architectural state for a first private vector shared by the first operations in the first thread;

a third register file that stores a third architectural state for a second private vector shared by the second operations in the second thread; and a front-end scheduler circuit that manages sharing between the second and the third architectural states to prevent collisions between data accesses to the the second and the third register files.

15. The processor circuit of claim 9 further comprising:

a front-end scheduler circuit that provides each of the first and the second threads access to the first architectural states for the matrix and that manages sharing between the first architectural states for the matrix to prevent collisions between data accesses to the first register file.

16. A method for processing first and second application programs using a processor circuit, the method comprising:

scheduling first instructions for the first application program using a first front-end circuit;

scheduling second instructions for the second application program using a second front-end circuit;

causing the first front-end circuit to schedule processing of first operations in the first instructions on a back-end processing circuit using a multi-program scheduler circuit;

causing the second front-end circuit to schedule processing of second operations in the second instructions on the back-end processing circuit using the multi-program scheduler circuit;

processing the first operations and the second operations using the back-end processing circuit;

storing a first architectural state in a first register file for a first private vector shared by a first subset of the first operations in a first thread in the first application program;

storing a second architectural state in a second register file for a second private vector shared by a second subset of the first operations in a second thread in the first application program; and managing sharing between the first and the second architectural states using a front-end scheduler circuit to prevent collisions between data accesses to the first and the second register files.

17. The method of claim 16, wherein processing the first and the second operations comprises processing the first operations using a first processing circuit and processing the second operations using a second processing circuit, and wherein causing the first front-end circuit to schedule processing of the first operations comprises causing the first processing circuit to process one of the first operations concurrently with the second processing circuit processing one of the second operations using the multi-program scheduler circuit.

18. The method of claim 16, wherein causing the first front-end circuit to schedule processing of the first operations comprises causing a first processing circuit to process a first one of the first operations in a first one of the first instructions concurrently with a second processing circuit processing a second one of the first operations in a second one of the first instructions using the multi-program scheduler circuit.

19. The method of claim 16 further comprising:

scheduling third instructions for a third application program that is different than the first and the second application programs using a third front-end circuit;

causing the third front-end circuit to schedule processing of third operations in the third instructions in the third application program on the back-end processing circuit using the multi-program scheduler circuit; and processing the third operations using the back-end processing circuit.

20. The method of claim 16 further comprising:

detecting and resolving a data dependency between data generated by a first one of the first operations processed by a first processing circuit and the data input to a second one of the first operations processed by a second processing circuit using a hazard detection circuit by tagging the first and the second ones of the first operations.

21. The method of claim 16 further comprising:

causing the first front-end circuit to schedule processing of first threads in the first application program using a thread scheduler and state controller circuit;

causing the second front-end circuit to schedule processing of second threads in the second application program using the thread scheduler and state controller circuit, wherein the back-end processing circuit comprises first and second processing circuits; and causing the first processing circuit to process one of the first operations in one of the first threads concurrently with the second processing circuit processing one of the second operations in one of the second threads using the thread scheduler and state controller circuit.

22. The method of claim 16 further comprising:

identifying coarse-grained instructions among the first and the second instructions that have no data dependencies using a hazard detection circuit in the back-end processing circuit; and scheduling and executing the coarse-grained instructions having no data dependencies out-of-order using the processor circuit, wherein the processor circuit comprises a coarse-grained complex instruction set computing processor architecture.

\* \* \* \* \*